United States Patent [19]

Poore, Jr.

[11] Patent Number: 5,537,119
[45] Date of Patent: Jul. 16, 1996

[54] METHOD AND SYSTEM FOR TRACKING MULTIPLE REGIONAL OBJECTS BY MULTI-DIMENSIONAL RELAXATION

[75] Inventor: Aubrey B. Poore, Jr., Fort Collins, Colo.

[73] Assignee: Colorado State University Research Foundation, Fort Collins, Colo.

[21] Appl. No.: 404,024

[22] Filed: Mar. 14, 1995

Related U.S. Application Data

[63] Continuation-in-part of Ser. No. 171,327, Dec. 21, 1993, Pat. No. 5,406,289.

[51] Int. Cl.$^6$ .................................................... G01S 13/00
[52] U.S. Cl. ........................................... 342/96; 342/90
[58] Field of Search ........................................ 342/90, 96

[56] References Cited

U.S. PATENT DOCUMENTS

| | | | |
|---|---|---|---|
| 3,849,779 | 11/1974 | Boyd | 343/7.4 |
| 3,869,601 | 3/1975 | Metcalf | 235/150.2 |
| 4,042,924 | 8/1977 | Evans et al. | 343/7 |
| 4,768,034 | 8/1988 | Preikschat et al. | 342/80 |
| 4,823,272 | 4/1989 | Inselberg | 364/461 |
| 4,839,658 | 6/1989 | Kathol et al. | 342/455 |
| 4,975,707 | 12/1990 | Smith | 342/357 |
| 5,058,024 | 10/1991 | Inselberg | 364/461 |
| 5,138,321 | 8/1992 | Hammer | 342/36 |
| 5,170,440 | 12/1992 | Cox | 382/22 |
| 5,406,289 | 4/1995 | Barker et al. | 342/96 |

FOREIGN PATENT DOCUMENTS

| | | |
|---|---|---|
| 4113291 | 4/1992 | Japan . |
| 4198886 | 7/1992 | Japan . |

OTHER PUBLICATIONS

W. P. Pierskalla, The multi-dimensional assignment problem, Operations Research, 16 (1968), pp. 422-431.

D. B. Reid, An algorithm for tracking multiple targets, IEEE Transaction On Automatic Control, vol. AC-24, No. 6, Dec. 1979, pp. 843-854.

P. Wolfe, Finding the nearest point in a polytope, Mathematical Programming, 11 (1976), pp. 128-149.

A. M. Frieze, A bilinear programming formulation of the 3-dimensional assignment problem, Mathematical Programming, 7 (1974), pp. 376-379.

A. M. Frieze and J. Yadegar, An algorithm for solving 3-dimensional assignment problems with application to scheduling a teaching practice, Journal of the Operational Research Society, 32 (1981), pp. 989-995.

M. Held and R. M. Karp, The traveling salesman problem and minimal trees, Part II, Mathematical Programming, 1 (1971), pp. 6-25.

(List continued on next page.)

*Primary Examiner*—Mark Hellner
*Attorney, Agent, or Firm*—Sheridan, Ross & McIntosh

[57] ABSTRACT

A method and system for real-time tracking of objects is disclosed. A region is repeatedly scanned providing a plurality of images or data sets having points corresponding to objects in the region to be tracked. Given a previously determined track for each object in the region, an M-dimensional combinatorial optimization assignment problem is formulated using the points from M-1 of the images or data sets, wherein each point is preferably used in extending at most one track. The M-dimensional problem is subsequently solved for an optimal or near-optimal assignment of the points to the tracks, extending the tracking of the objects so that a response to each object can be initiated by the system in real-time. Speed and accuracy is provided by an iterative Lagrangian Relaxation technique wherein a plurality of constraint dimensions are relaxed simultaneously to yield a reduced dimensional optimization problem whose solution is used to formulate an assignment problem of dimensionality less than M. The iterative reducing of dimensions terminates when exact solutions are determined for two-dimensional cases. A recovery procedure is used for determining a higher dimensional assignment problem solution from a problem having one less dimension. The procedure is useful when the reduced dimensional optimizational problem has two constraint dimensions.

58 Claims, 6 Drawing Sheets

OTHER PUBLICATIONS

C. L. Morefield, Application of 0–1 integer programming to multitarget tracking problems, IEEE Transactions on Automatic Control, vol. AC–22, No. 3 Jun. 1977 pp. 302–312.

Y. Bar–Shalom, Tracking methods in a multitarget environment, IEEE Transactions on Automatic Control, vol. AC–23, No. Aug. 1978, pp. 618–626.

C. Lemarechal, Bundle methods in nonsmooth optimization, in C. Lemarechal and R. Mifflin, eds. Nonsmooth Optimization ILASA Proceedings 3, Pergamon, Oxcord, 1978, pp. 79–102.

R. W. Sittler, An Optimal data association problem in surveillance theory, IEEE Transactions on Military Electronics, Apr. 1964, pp. 125–139.

P. Wolfe, A method of conjugate subgradients for minimizing nondifferentiable functions, Mathematical Programming Study, 3 (1975), pp. 147–173.

A. M. Frieze, A bilinear programming formulation of the 3–dimensional assignment problem, Mathematical Programming, 7, pp. 376–379, 1974.

Somnath D., A new algorithm for the generalized multidimensional assignment problem, IEEE International Conf. on Systems, Man and Cybernetics, Chicago 92.

Danchick, R. A. Multisensor–Multitarget Data Association Algorithm for Heterogeneous Sensors, IEEE Transactions On Aerospace and Electronic Systems vol. 29, No. 2, Apr. 1993.

Somnath Deb, A S–dimenisonal assignment algorithm for track initiation, IEEE Systems Conf. Kobe Japan Sep. 1992.

Pattipati, A new relaxation algorithm and Passive Sensor Data Association, IEEE Transactions on Automatic Control vol. 37, No. 2, Feb. 1992 Computer Printout.

Rijavec, Nenad Dissertation, A Lagrangian Relaxation Algorithm For Some Multidimensional Assignment Problems, Submitted to Colorado State University, 1992.

A. B. Poore and N. Rijavec, Partitioning Multiple Data Sets: Multidimensional Assignments and Lagrangian Relaxation, DIMACS Series in Discrete Mathematics and Theoretical Computer Science, vol. 16, 1994, pp. 317–342.

Poore, A. B., Multidimensional Assignment Formulation of Data Association Problems Arising from Multitarget and Multisensor Tracking, Computational Optimization and Applications, 3, (1994), pp. 27–57.

A. B. Poore and N. Rijavec, A Numerical Study of Some Data Association Problems Arising in Multitarget Tracking, Large Scale Optimization: State of the Art, 1994, pp. 339–361.

A. B. Poore and N. Rijavec, Three Algorithms for a Class of Multidimensional Assignment Problems, Journal of Computing and Information Technology–CIT 2, No. 1, 1994, pp. 25–37.

A. B. Poore and N. Rijavec, A Relaxation Algorithm for Multidimensional Assignments, Proceedings of the Third Conference on Operations Research, Croatian Operational Research Society, Oct. 1993, pp. 107–116.

A. B. Poore and N. Rijavec, A New Class of Methods for Solving Data Association Problems Arising from Multitarget Tracking, Proceedings of the 1991 American Automatic Control Conference, vol. 3, pp. 2303–2304.

A. B. Poore and N. Rijavec, Multitarget Tracking and Multidimensional Assignment Problems, Proceedings of the 1991 SPIE Conference on Signal and Data Processing of Small Targets 1991, vol. 1481, 1991, pp. 345–356.

A. B. Poore and N. Rijavec, The Data Association Problem in Multitarget Tracking and Multidimensional Assignment Problems, the Proceedings of the SDI Panels on Tracking, Institute for Defense Analyses, Issue No. Feb. 1991, pp. 3–29, to 3–51.

A. B. Poore and N. Rijavec, Multitarget Tracking, Multidimensional Assignment Problems, and Lagrangian Relaxation, Proceedings of the SDI Panels on Tracking, Institute for Defense Analyses, Issue No. Feb. 1991, pp. 3–51, to 3–74.

A. B. Poore, N. Rijavec and T. Barker, Data association for track initiation and extension using multiscan windows, Signal and Data Processing of Small Targets 1992, Proc. SPIE 1698, 1992, pp. 432–441.

A. B. Poore and N. Rijavec, A Lagrangian Relaxation Algorithm for Multi–dimensional Assignment Problems Arising from Multitarget Tracking, SIAM Journal on Optimization, vol. 3, No. 3, 1993, pp. 544–563.

A. B. Poore, N. Rijavec, M. Liggins and V. Vannicola, Data association problems posed as multidimensional assignment problems; problem formulation, Signal and Data Processing of Small Targets 1954, Proc. SPIE, 1993, pp. 552–561.

A. B. Poore, N. Rijavec, T. Barker and M. Munger, Data association problems posed as multidimensional assignment problems: numerical simultions, Signal and Data Processing of Small Targets 1954, Proc. SPIE, 1993, pp. 564–573.

A. B. Poore, N. Rijavec, T. Barker and N. Munger, Data association problems posed as multidimensional assignment problems; algorithm development, Signal Processing, Sensor Fusion, and Target Recognition II 1955, Proc. SPIE, 1993, pp. 172–183.

A. B. Poore and N. Rijavec, A Comparison of Several Algorithms for Multidimensional Assignments, Proceedings of the 15th International Conference on Information Technology Interfaces, University Computing Centre, Croatia, Jun. 1993, pp. 413–418.

METHOD AND SYSTEM FOR TRACKING MULTIPLE REGIONAL OBJECTS BY MULTI-DIMENSIONAL RELAXATION

GOVERNMENT RIGHTS

This invention was made in part with government support under a grant of the Department of the Air Force. The Government has certain rights in this invention.

RELATED APPLICATIONS

This application is a continuation-in-part of U.S. patent application Ser. No. 08/171,327 filed Dec. 21, 1993, and entitled "METHOD AND SYSTEM FOR TRACKING MULTIPLE REGIONAL OBJECTS". Now U.S. Pat. No. 5,406,289.

FIELD OF THE INVENTION

The invention relates generally to computerized techniques for processing data obtained from radiation reflections used to track multiple discrete object.

BACKGROUND OF THE INVENTION

The invention relates generally to computerized techniques for processing data obtained from radar to track multiple discrete objects.

There are many situations where the courses of multiple objects in a region must be tracked. Typically, radar is used to scan the region and generate discrete images or "snapshots" based on sets of returns or observations. In some types of tracking systems, all the returns from any one object are represented in an image as a single point unrelated to the shape or size of the objects. "Tracking" is the process of identifying a sequence of points from a respective sequence of the images that represents the motion of an object. The tracking problem is difficult when there are multiple closely spaced objects because the objects can change their speed and direction rapidly and move into and out of the line of sight for other objects. The problem is exacerbated because each set of returns may result from noise as well as echoes from the actual objects. The returns resulting from the noise are also called false positives. Likewise, the radar will not detect all echoes from the actual objects and this phenomena is called a false negative or "missed detect" error. For tracking airborne objects, a large distance between the radar and the objects diminishes the signal to noise ratio so the number of false positives and false negatives can be high. For robotic applications, the power of the radar is low and as a result, the signal to noise ratio can also be low and the number of false positives and false negatives high.

In view of the proximity of the objects to one another, varied motion of the objects and false positives and false negatives, multiple sequential images should be analyzed collectively to obtain enough information to properly assign the points to the proper tracks. Naturally, the larger the number of images that are analyzed, the greater the amount of information that must be processed.

While identifying the track of an object, a kinematic model describing the object's location, velocity and acceleration may be generated. Such a model provides the means by which the object's future motion can be predicted. Based upon such a prediction, appropriate action may be initiated. For example, in a military application there is a need to track multiple enemy aircraft or missiles in a region to predict their objective, plan responses and intercept them. Alternatively, in a commercial air traffic control application there is a need to track multiple commercial aircraft around an airport to predict their future courses and avoid collision. Further, in these and other applications, such as robotic applications, may use radar, sonar, infrared or other object detecting radiation bandwidths for tracking objects. In particular, in robotic applications reflected radiation can be used to track a single object which moves relative to the robot (or vice versa) so the robot can work on the object.

Consider the very simple example of two objects being tracked and no false positives or false negatives. The radar, after scanning at time $t_1$, reports objects at two locations in a first observation set. That is, it returns a set of two observations $\{o_{11}, o_{12}\}$. At time $t_2$ it returns a similar set of two observations $\{o_{21}, o_{22}\}$ from a second observation set. Suppose from prior processing that track data for two tracks $T_1$ and $T_2$ includes the locations at $t_0$ of two objects. Track $T_1$ may be extended through the points in the two sets of observations in any of four ways, as may track $T_2$. The possible extensions of $T_1$ can be described as: $\{T_1, o_{11}, o_{21}\}$, $\{T_1, o_{11}, o_{22}\}$, $\{T_1, o_{12}, o_{21}\}$ and $\{T_1, o_{12}, o_{22}\}$. Tracks can likewise be extended from $T_2$ in four possible ways including, $\{T_2, o_{12}, o_{21}\}$. FIG. 1 illustrates these five (out of eight) possible tracks (to simplify the problem for purposes of explanation). The five track extensions are labeled $h_{11}$, $h_{12}$, $h_{13}$, $h_{14}$, and $h_{21}$ wherein $h_{11}$ is derived from $\{T_1, o_{11}, o_{21}\}$, $h_{12}$ is derived from $\{T_1, o_{11}, o_{22}\}$, $h_{13}$ is derived from $\{T_1, o_{12}, o_{21}\}$, $h_{14}$ is derived from $\{T_1, o_{12}, o_{22}\}$, and $h_{21}$ is derived from $\{T_2, o_{11}, o_{21}\}$. The problem of determining which such track extensions are the most likely or optimal is hereinafter known as the assignment problem.

It is known from prior art to determine a figure of merit or cost for assigning each of the points in the images to a track. The figure of merit or cost is based on the likelihood that the point is actually part of the track. For example, the figure of merit or cost may be based on the distance from the point to an extrapolation of the track. FIG. 1 illustrates costs $\delta_{21}$ and $\delta_{22}$ for hypothetical extension $h_{21}$ and modeled target characteristics. The function to calculate the cost will normally incorporate detailed characteristics of the sensor, such as probability of measurement error, and track characteristics, such as likelihood of track maneuver.

FIG. 2 illustrates a two by two by two matrix, c, that contains the costs for each point in relation to each possible track. The cost matrix is indexed along one axis by the track number, along another axis by the image number and along the third axis by a point number. Thus, each position in the cost matrix lists the cost for a unique combination of points and a track, one point from each image. FIG. 2 also illustrates a $\{0, 1\}$ assignment matrix, z, which is defined with the same dimensions as the cost matrix. Setting a position in the assignment matrix to "one" means that the equivalent position in the cost matrix is selected into the solution. The illustrated solution matrix selects the $\{h_{14}, h_{21}\}$ solution previously described. Note that for the above example of two tracks and two snapshots, the resulting cost and assignment matrices are three dimensional. As used in this patent application, the term "dimension" means the number of axes in the cost or assignment matrix while size refers to the number of elements along a typical axis. The costs and assignments have been grouped in matrices to facilitate computation.

A solution to the assignment problem satisfies two constraints—first, the sum of the associated costs for assigning points to a track extension is minimized and, second, if no false positives or false negatives exist, then each point is assigned to one and only one track.

When false positives exist, however, additional hypothetical track extensions incorporating the false positives will be generated. Further note that the random locations of false positives will, in general, not fit well with true data and such additional hypothetical track extensions will result in higher costs. Also note that when false negative errors exist, then the size of the cost matrix must grow to include hypothetical track extensions formulated with "gaps" (i.e., data omissions where there should be legitimate observation data) for the false negatives. Thus, the second criteria must be weakened to reflect false positives not being as signed and also to permit the gap filler to be multiply assigned. With hypothetical cost calculated in this manner then the foregoing criteria for minimization will tend to materialize the false negatives and avoid the false positives.

For a 3-dimensional problem, as is illustrated in FIG. 1, but with $N_1$ (initial) tracks, $N_2$ observations in scan 1, $N_3$ observations in scan 2, false positives and negatives assumed, the assignment problem can be formulated as:

(a) Minimize: $\sum_{i_1=0}^{N_1} \sum_{i_2=0}^{N_2} \sum_{i_3=0}^{N_3} c_{i_1 i_2 i_3} z_{i_1 i_2 i_3}$ [1.0]

(b) Subject to: $\sum_{i_2=1}^{N_2} \sum_{i_3=1}^{N_3} z_{i_1 i_2 i_3} = 1, i_1 = 1, \ldots N_1$ (c) $\sum_{i_1=1}^{N_1} \sum_{i_3=1}^{N_3} z_{i_1 i_2 i_3} \leq 1, i_2 = 1, \ldots N_2$ (d) $\sum_{i_1=1}^{N_1} \sum_{i_2=1}^{N_2} z_{i_1 i_2 i_3} \leq 1, i_3 = 1, \ldots N_3$ (e) $z_{i_1 i_2 i_3} \in \{0, 1\} \; \forall \; z_{i_1 i_2 i_3}$ where "c" is the cost and "z" is a point or observation assignment, as in FIG. 2.

The minimization equation or equivalently objective function [1.0](a) specifies the sum of the element by element product of the c and z matrices. The summation includes hypothesis representations $z_{i_1 i_2 i_3}$ with observation number zero being the gap filler observation. Equation [1.0](b) requires that each of the tracks $T_1, \ldots, T_{N_1}$ be extended by one and only one hypothesis. Equation [1.0](c) relates to each point or observation in the first observation set and requires that each such observation, except the gap filler, can only associate with one track but because of the "less than" condition it might not associate with any track. Equation [1.0](d) is like [1.0](c) except that it is applicable to the second observation set. Equation [1.0](e) requires that elements of the solution matrix z be limited to the zero and one values.

The only known method to solve Problem Formulation [1.0] exactly is a method called "Branch and Bound." This method provides a systematic ordering of the potential solutions so that solutions with a same partial solution are accessible via a branch of a tree describing all possible solutions whereby the cost of unexamined solutions on a branch are incrementally developed as the cost for other solutions on the branch are determined. When the developing cost grows to exceed the previously known minimal cost (i.e., the bound) then enumeration of the tree branch terminates. Evaluation continues with a new branch. If evaluation of the cost of a particular branch completes, then that branch has lower cost than the previous bound so the new cost replaces the old bound. When all possible branches are evaluated or eliminated then the branch that had resulted in the last used bound is the solution. If we assume that $N_1=N_2=N_3=n$ and that branches typically evaluate to half there full length, then workload associated with "branch and bound" is proportional to $$\left( n! \mid \frac{n}{2} \mid ! \right)^2.$$

This workload is unsuited to real time evaluation.

The Branch and Bound algorithm has been used in past research on the Traveling Salesman Problem. Messrs. Held and Karp showed that if the set of constraints was relaxed by a method of Lagrangian Multipliers (described in more detail below) then tight lower bounds could be developed in advance of enumerating any branch of the potential solution. By initiating the branch and bound algorithm with such a tight lower bound, significant performance improvements result in that branches will typically evaluate to less than half their full length.

Messrs. Frieze and Yadagar in dealing with a problem related to scheduling combinations of resources, as in job, worker and work site, showed that Problem Formulation [1.0] applied. They further described a solution method based upon an extension of the Lagrangian Relaxation previously mentioned. The two critical extensions provided by Messrs. Frieze and Yadagar were: (1) an iterative procedure that permitted the lower bound on the solution to be improved (by "hill climbing" described below) and (2) the recognition that when the lower bound of the relaxed problem was maximized, then there existed a method to recover the solution of the non-relaxed problem in most cases using parameters determined at the maximum. The procedures attributed to Messrs. Frieze and Yadagar are only applicable to the 3-dimensional problem posed by Problem Formulation [1.0] and where the cost matrix is fully populated. However, tracking multiple airborne objects usually requires solution of a much higher dimensional problem.

FIGS. 1 and 2 illustrate an example where "look ahead" data from the second image improved the assignment accuracy for the first image. Without the look ahead, and based only upon a simple nearest neighbor approach, the assignments in the first set would have been reversed. Problem Formulation [1.0] and the prior art only permit looking ahead one image. In the prior art it was known that the accuracy of assignments will improve if the process looks further ahead, however no practical method to optimally incorporate look ahead data existed. Many real radar tracking problems involve hundreds of tracks, thousands of observations per observation set and matrices with dimensions in the range of 3 to 25 including many images of look ahead.

It was also known that the data assignment problem may be simplified (without reducing the dimension of the assignment problem) by eliminating from consideration for each track those points which, after considering estimated limits of speed and turning ability of the objects, could not physically be part of the track. One such technique, denoted hereinafter the "cone method," defines a cone as a continuation of each previously determined track with the apex of the cone at the end of the previously defined track. The length of the cone is based on the estimated maximum speed of the object and the size of the arc of the cone is based on the estimated maximum turning ability of the object. Thus, the cone defines a region outside of which no point could physically be part of the respective track. For any such points outside of the cones, an infinite number could be put in the cost matrix and a zero could be preassigned in the assignment matrix. It was known for the tracking problem that these elements will be very common in the cost and selection matrices (so these matrices are "sparse").

It was also known in the prior art that one or more tracks which are substantially separated geographically from the other tracks can be separated also in the assignment problem. This is done by examining the distances from each point to the various possible tracks. If the distances from one set of points are reasonably short only in relation to one track, then they are assigned to that track and not further considered with the remainder of the points. Similarly, if a larger group of points can only be assigned to a few tracks, then the group is considered a different assignment problem. Because the complexity of assignment problems increases dramatically with the number of possible tracks and the total number of points in each matrix, this partitioning of the group of points into a separate assignment problem and removal of these points from the matrices for the remaining points, substantially reduces the complexity of the overall assignment problem.

A previously known Multiple Hypothesis Testing (MHT) algorithm (see Blackman, Multiple-Target Tracking with Radar Applications, Chapter 10, Artech House Norwood Mass., 1986) related to formulation and scoring. The MHT procedure describes how to formulate the sparse set of all reasonable extension hypothesis (for FIG. 1 the set $\{h_{11} \ldots h_{24}\}$) and how to calculate a cost of the hypothesis $\{T_i, o_{1j}, o_{2k}\}$ based upon the previously calculated cost for hypothesis $\{T_i, o_{1j}\}$. The experience with the MHT algorithm, known in the prior art, is the basis for the assertion that look ahead through k sets of observations results in improved assignment of observations from the first set to the track.

In theory, the MHT procedure uses the extendable costing procedure to defer assignment decision until the accumulated evidence supporting the assignment becomes overwhelming. When it makes the assignment decision it then eliminates all potential assignments invalidated by the decision in a process called "pruning the tree." In practice, the MHT hypothesis tree is limited to a fixed number of generations and the overwhelming evidence rule is replaced by a most likely and feasible rule. This rule considers each track independently of others and is therefore a local decision rule.

A general object of the present invention is to provide an efficient and accurate process for assigning each point object in a region from multiple images to a proper track and then taking an action based upon the assignments.

A more specific object of the present invention is to provide a technique of the foregoing type which determines the solution of a k-dimensional assignment problem where "k" is greater than or equal to three.

SUMMARY OF THE INVENTION

The present invention relates to a method and apparatus for tracking objects. In particular, the present invention tracks movement or trajectories of objects by analyzing radiation reflected from the objects, the invention being especially useful for real-time tracking in noisy environments.

In providing such a tracking capability, a region containing the objects is repeatedly scanned to generate a multiplicity of sequential images or data observation sets of the region. One or more points (or equivalently observations), in each of the images or observation sets are detected wherein each such observation either corresponds to an actual location of an object or is an erroneous data point due to noise. Subsequently, for each observation detected, figures of merit or costs are determined for assigning the observation to each of a plurality of previously determined tracks. *Afterwards, a first optimization problem is specified which includes:

(a) a first objective function for relating the above mentioned costs to potential track extensions through the detected observations (or simply observations); and (b) a first collection of constraint sets wherein each constraint set includes constraints to be satisfied by the observations in a particular scan to which the constraint set is related. In general, there is a constraint for each observation of the scan, wherein the constraint indicates the number of track extensions to which the observation may belong.

In particular, the first optimization problem is formulated, generated or defined as an M-dimensional assignment problem wherein there are M constraint sets in the first collection of constraint sets (i.e., there are M scans being examined) and the first objective function minimizes a total cost for assigning observations to various track extensions wherein terms are included in the cost, such that the terms have the figures of merit or costs for hypothesized combinations of assignments of the observations to the tracks. Subsequently, the formulated M-dimensional assignment problem is solved by reducing the complexity of the problem by generating one or more optimization problems each having a lower dimension and then solving each lower dimension optimization problem. That is, the M-dimensional assignment problem is solved by solving a plurality of optimization problems each having a lower number of constraint sets.

The reduction of the M-dimensional assignment problem to a lower dimensioned problems is accomplished by relaxing the constraints on the points of one or more scans thereby permitting these points to be assigned to more than one track extension. In relaxing the constraints, terms having penalty factors are added into the objective function thereby increasing the total cost of an assignment when one or more points are assigned to more than one track. Thus, the reduction in complexity by this relaxation process is iteratively repeated until a sufficiently low dimension is attained such that the lower dimensional problem may be solved directly by known techniques.

In one embodiment of the invention, each k-dimensional assignment problem $2<k\leq M$, is iteratively reduced to a k–1 dimensional problem until a 2-dimensional problem is specified or formulated. Subsequently, the 2-dimensional problem formulated is solved directly and a "recovery" technique is used to iteratively recover an optimal or near-optimal solution to each k-dimensional problem from a derived (k–1) dimensional problem k=2,3,4, . . . M.

In performing each recovery step (of obtaining a solution to a k-dimensional problem using a solution to a (k–1)-dimensional problem) an auxiliary function, is utilized. In particular, to recover an optimal or near-optimal solution to a k-dimensional problem, an auxiliary functions $\Psi_{k-1}$, k=4,5, . . . ,M, is specified and a region or domain is determined wherein this function is maximized, whereby values of the region determine the penalty factors of the (k–1)-dimensional problem such that another 2-dimensional problem can be formulated which determines a solution to the k-dimensional problem using the penalty factors of the (k–1)-dimensional problem.

Each Auxiliary function $\Psi_k$, k=3, . . . , M–1, is a function of both lower dimensional problem penalty factors and a solution at the dimension k at which the penalized cost function is solved directly (typically a 2-dimensional problem). Further, in determining, for auxiliary function $\Psi_k$, a peak region, a gradient of the auxiliary function is determined, and utilized to identify the peak region. Thus, gradients are used for each of the approximation functions $\Psi_3, \Psi_4, \ldots$ which are sequentially formulated and used in determining penalty factors penalty factors until tm−1 is used in determining the penalty factors for the M−1 dimensional problem. Subsequently, once the M-dimensional problem is solved (using a 2-dimensional problem to go from an (M−1) dimensional solution to an M-dimensional solution), one or more of the following actions are taken based on the track assignments: sending a warning to aircraft or a ground or sea facility, controlling air traffic, controlling anti-aircraft or anti-missile equipment, taking evasive action, working on one of the objects.

According to one feature of this first embodiment of the present invention, the following steps are also performed before the step of defining the auxiliary function. A preliminary auxiliary function is defined for each of the lower dimensional problems having a dimension equal or one greater than the dimension at which the penalized cost function is solved directly. The preliminary auxiliary function is a function of lower order penalty values and a solution at the dimension at which the penalized cost function was solved directly. In determining a gradient of the preliminary auxiliary function, step in the direction of the gradient to identify a peak region of the preliminary auxiliary function and determine penalty factors at the peak region. Iteratively repeat the defining, gradient determining, stepping and peak determining steps to define auxiliary functions at successively higher dimensions until the auxiliary function at 6–18 (k−1) dimension is determined. In an alternative second embodiment of the present invention, instead of reducing the dimentiality of the M-dimensional assignment problem by a single dimension at a time, a plurality of dimensions are relaxed simultaneously. This new strategy has the advantage that when the M-dimensional problem is relaxed directly to a 2-dimensional assignment problem, then all computations may be performed precisely without utilizing an auxiliary function such as $\Psi_k$ as in the first embodiment. More particularly, the second embodiment solves the first optimization problem (i.e., the M-dimensional assignment problem) by specifying (i.e., creating, generating, formulating and/or defining) a second optimization problem. The second optimization problem includes a second objective function and a second collection of constraint sets wherein:

a) the second objective function is a combination of the first objective function and penalty factors or terms determined for incorporating M−m constraint sets of the first optimization problem into the second objective function;

b) the constraint sets of the second collection include only m of the constraint sets of the first collection of constraints, wherein $2 \leq m \leq M-1$. Note that, once the second optimization problem has been specified or formulated, an optimal or near-optimal solution is determined and that solution is used in specifying (i.e, creating, generating, formulating and/or defining) a third optimization problem of M−m dimensions (or equivalently constraint sets). The third optimization problem is subsequently solved by decomposing it using the same procedure of this second embodiment as was used to decompose the first optimization problem above. Thus, a plurality of instantiations of the third optimization problem are specified, each successive instantiation having a lower number of dimensions, until an instance of the third optimization problem is a two dimensional assignment problem which can be solved directly. Subsequently, whenever an instance of the third optimization problem is solved, the solution is used to recover a solution to the instance of the first optimization problem from which this instance of the third optimization was derived. Thus, an optimal or near-optimal solution to the original first optimization problem may be recovered through iteration of the above steps.

As mentioned above, the second embodiment of the present invention is especially advantageous when m=2, since in this case all computations may be performed precisely and without utilizing auxiliary functions.

Other features and benefits of the present invention will become apparent from the detailed description with the accompanying drawings contained hereinafter.

DETAILED DESCRIPTION OF THE PREFERRED EMBODIMENTS

Figures 1, 2:
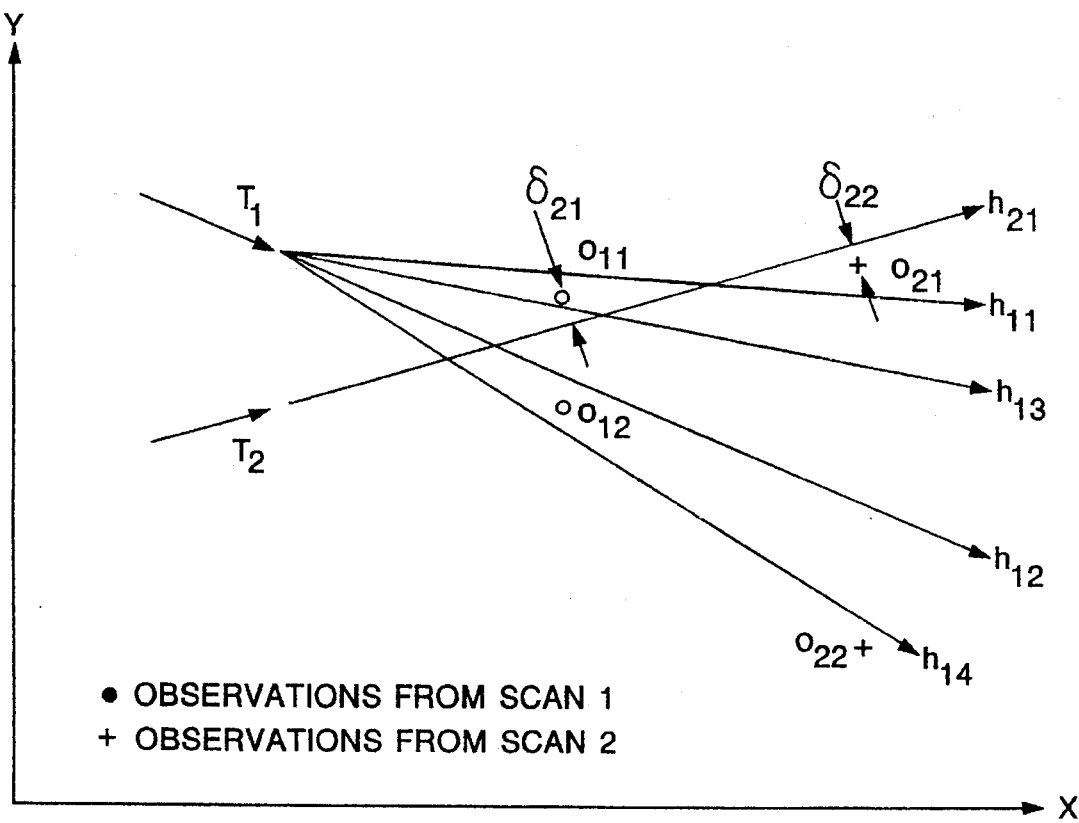
FIG. 1 is a graph of images or data sets generated by a scan of a region and possible tracks within the images or data sets according to the prior art.
FIG. 2 illustrates cost and assignment matrices for the data sets of FIG. 1 according to the prior art.
Figure 3:
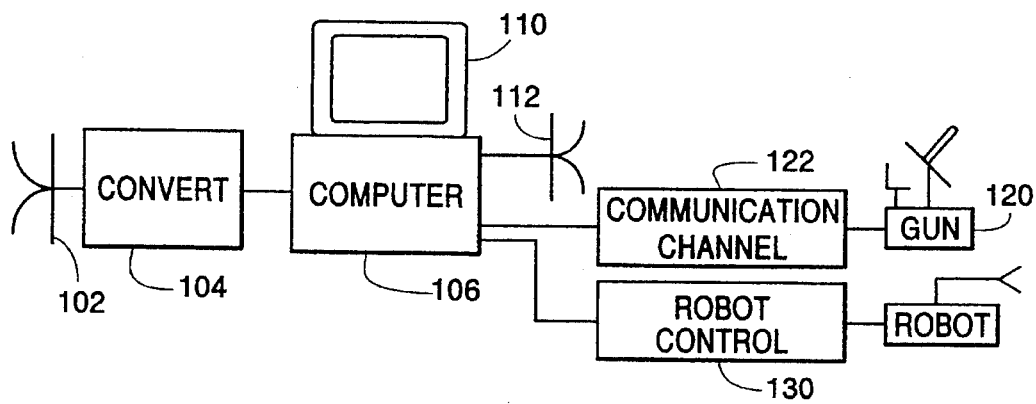
FIG. 3 is a block diagram of the present invention.

Referring now to the other figures in detail wherein like reference numerals indicate like elements throughout the several views, FIG. 3 illustrates a system generally designated 100 for implementing the present invention. System 100 comprises, for example, a radar station 102 (note sonar, microwave, infrared and other radiation bandwidths are also contemplated) for scanning a region which may be, for example, an aerial region (in aerial surveillance applications) or a work region (in robotic applications) and generating signals indicating locations of objects within the region. The signals are input to a converter 104 which converts the signals to data points or observations in which each object (or false positive) is represented by a single point. The output of the converter is input to and readable by a computer 106. As described in more detail below, the computer 106 assigns the points to respective tracks, and then displays the tracks and extrapolations of the tracks on a monitor 110. Also, the computer 106 determines an appropriate action to take based on the tracks and track extensions. For example, in a commercial application at an airport, the computer can determine if two aircraft being tracked are on a collision course and if so, signal a transmitter 112 to warn each aircraft, or if a scheduled take-off will pose the risk of collision, delay the take-off. For a military application on a ship or base, the computer can determine subsequent coordinates of enemy aircraft and send the coordinates to an antiaircraft gun or missile 120 via a communication channel 122. In a robotic application, the computer controls the robot to work on the proper object or portion of the object.

The invention generates k-dimensional matrices where k is the number of images or sets of observation data in the look ahead window plus one. Then, the invention formulates a k-dimensional assignment problem as in [1.0] above.

The k-dimensional assignment problem is subsequently relaxed to a (k–1)-dimensional problem by incorporating one set of constraints into the objective function using a Lagrangian relaxation of this set. Given a solution of the (k–1)-dimensional problem, a feasible solution of the k-dimensional problem is then reconstructed. The (k–1)-dimensional problem is solved in a similar manner, and the process is repeated until it reaches the two-dimensional problem that can be solved exactly. The ideas behind the Lagrangian relaxation scheme are outlined next.

Consider the integer programming problem

Minimize   $v(z) = c^T z$   [1.0.1]

Subject to:   $Az \leq b$
              $Bz \leq d$ $z_i$ is an integer for $i \in I$ where the partitioning of the constraints is natural in some sense. Given a multiplier vector $u \geq 0$, the Lagrangian relaxation of [1.0.1] relative to the constraints $Bz \leq d$ is defined to be $\Phi(u) = $ Minimize   $\{c^T z + u^T (Bz - d)\}$   [1.0.2]

Subject to:   $Az \leq b$ $z_i$ is an integer for $i \in I$

If the constraint set $Bz \leq d$ is replaced by $Bz = d$, the nonnegativity constraint on u is removed. $L = c^T z + u^T (Bz - d)$ is the Lagrangian relative to the constraints $Bz \leq d$, and hence the name Lagrangian relaxation. The following fact gives the relationship between the objective functions of the original and relaxed problems.

FACT A.1. If $\bar{z}$ is an optimal solution to [1.0.1], then $\Phi(u) \leq v(\bar{z})$ for all $u \geq 0$. If an optimal solution $\hat{z}$ of [1.0.2] is feasible for [1.0.2], then $\hat{z}$ is an optimal solution for [1.0.1] and $\Phi(u) = v(\bar{z})$.

This leads to the following algorithm:

Algorithm. Construct a sequence of multipliers $\{u_k\}_{k=0}^\infty$ converging to the solution $\bar{u}$ of Maximize $\{\Phi(u): u \geq 0\}$ and a corresponding sequence of feasible solutions $\{z_k\}_{k=0}^\infty$ of [1.0.1] as follows:

1. Generate in initial approximation $u_0$.

2. Given $u_k$, choose a search direction $s_k$ and a search distance $\alpha_k$ so that $\Phi(u_k + \alpha_k s_k) > \Phi(u_k)$. Update the multiplier estimate $u_k$ by $u_{k+1} = u_k + \alpha_k s_k$.

3. Given $u_{k+1}$ and a feasible solution $\hat{z}_{k+1}(u_{k+1})$ of [1.0.2], recover a feasible solution $z_{k+1}(u_{k+1})$ of the integer programming problem [1.0.1].

4. Check the termination criteria. If the algorithm is not finished, set k=k+1 and return to Step 2. Otherwise, terminate the algorithm.

If $\bar{z}$ is an optimal solution of [1.0.1], then $\Phi(u_k) \leq \Phi(\bar{u}) \leq v(\bar{z}) \leq (z_k)$ Since the optimal solution $\hat{z} = \hat{z}(u)$ of [1.0.2] is usually not a feasible solution of [1.0.1] for any choice of the multipliers, $\Phi(\bar{u})$ is usually strictly less than $v(\bar{z})$. The difference $v(\bar{z}) - \Phi(\bar{u})$ is called the "duality gap," which can be estimated by comparing the best relaxed and recovered solutions computed in the course of maximizing $\Phi(u)$.

Thus, to eliminate the "<" in the constraint formulations (e.g., [1.0](a)–[1.0](d)) that resulted from false positives, the constraint sets have been modified, as indicated above, to incorporate a gap filler in each observation set to account for false positives. Thus, a zero for an index $i_p$, $1 \leq p \leq k$ in $z_{i_1 \ldots i_k}$ in problem [1.1] below indicates that the track extension represented by $z_{i_1 \ldots i_k}$ includes a false positive in the $p^{th}$ observation set. Note that this implies that a hypothesis be formed incorporating an observation with k–1 gap fillers, e.g., $z_{0 \ldots 0, i_p, 0 \ldots 0}$, $i_p \neq 0$. Thus, the resulting generalization of Problem Formulation [1.0] without the "less than" complication within the constraints is the following k-Dimensional Assignment Problems in which $k \geq 3$:

Minimize:   $\sum\limits_{i_1=0}^{N_1} \ldots \sum\limits_{i_k=0}^{N_k} c_{i_1 \ldots i_k} z_{i_1 \ldots i_k}$   [1.1]

Subject to:   $\sum\limits_{i_2=0}^{N_2} \ldots \sum\limits_{i_k=0}^{N_k} z_{i_1 \ldots i_k} = 1, i_1 = 1, \ldots N_1$ $\sum\limits_{i_1=0}^{N_1} \ldots \sum\limits_{i_{j-1}=0}^{N_{j-1}} \sum\limits_{i_{j+1}=0}^{N_{j+1}} \ldots \sum\limits_{i_k=0}^{N_k} z_{i_1 \ldots i_k} = 1,$ for $i_j = 1, \ldots N_j$ and
$j = 2, \ldots k-1$ $\sum\limits_{i_1=0}^{N_1} \ldots \sum\limits_{i_{k-1}=0}^{N_{k-1}} z_{i_1 \ldots i_k} = 1, i_k = 1, \ldots N_k$ $z_{i_1 \ldots i_k} \in \{0, 1\}, \forall i_n, n = 1, \ldots, k$ where c and z are similarly dimensioned matrices representing costs and hypothetical assignments. Note, in general, for tracking problems these matrices are sparse.

After formulating the k-dimensional assignment problem as in [1.1], the present invention solves the resulting problem so as to generate the outputs required by devices 110, 112, 122 and 130. For each observation set $O_i$ received from converter 104 at time $t_i$ where $i=1, \ldots, N_1$, the computer processes $O_i$ in a batch together with the other observation sets $O_{i-k+1}, \ldots, O_i$ and the track $T_{i-k}$, i.e., $T_j$ is the set of all tracks that have been defined up to but not including $O_j$. (Note, bold type designations refer to the vector of elements for the indicated time, i.e., the set of all observations in the scan or tracks existing at the time, etc.) The result of this processing is the new set of tracks $T_{i-k+1}$ and a set of cost weighted possible solutions indicating how the tracks might extend to the current time $t_i$. At time $t_{i+1}$ the batch process is repeated using the newest observation set and deleting the oldest. Thus, there is a moving window of observation sets which is shifted forward to always incorporate the most recent observation set. The effect is that input observation sets are reused for k–1 cycles and then on the observation set's k-th reuse each observation within the observation set is integrated into a track.

Figure 7:
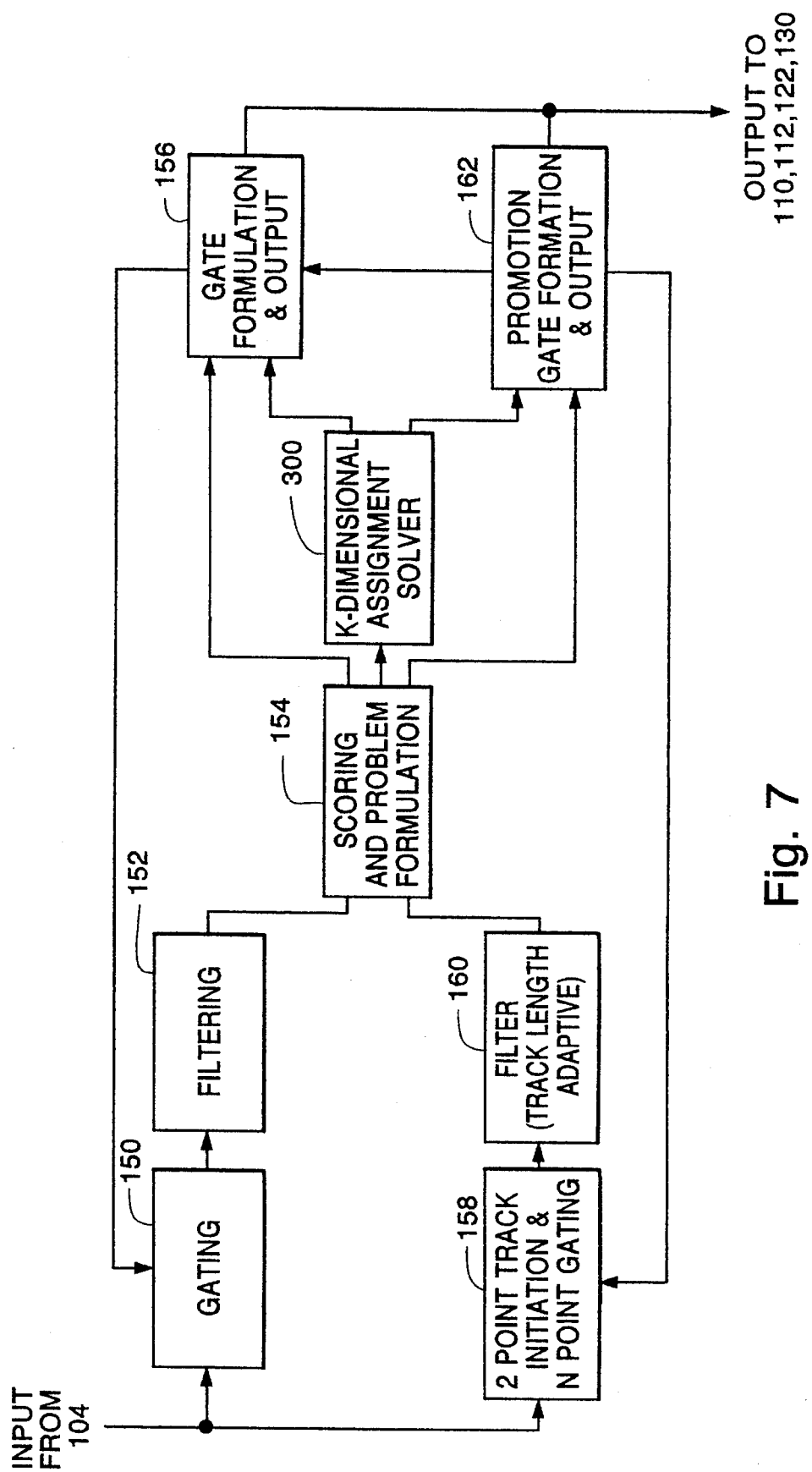
FIG. 7 is another block diagram of the present invention for solving the k-dimensional assignment problem where "k" is greater than or equal to 3.

FIG. 7 illustrates various processes implemented upon receipt of each observation set. Except for the addition of the k-dimensional assignment solving process 300 and the modification to scoring process 154 to build data structures suitable for process 300, all processes in FIG. 7 are based upon prior art. The following processes 150 and 152 extend previously defined tracks $h_{i-1}$ based on new observations. Gate formulation and output process 156 determines, for each of the previously defined tracks, a zone wherein the track may potentially extend based on limits of velocity, maneuverability and radar precision. One such technique to accomplish this is the cone method described previously. The definition of the zone is passed to gating process 150. When a new observation set $O_i$ is received, the gating process 150 will match each member observation with the zone for each member of the hypothetical set $h_{i-1}$. After all input observations from $O_i$ are processed the new hypothesis set $h_i$ is generated by extending each track of the prior set of hypothetical tracks $h_{i-1}$ either with missed detect gap fillers or with all new observation elements satisfying the track's zone. This is a many to many matching in that each hypothesis member can be extended to many new observations and each new observation can be used to extend many hypotheses. It, however, is not a full matching in that any hypothesis will neither be matched to all observations nor vice versa. It is this matching characteristic that leads to the sparse matrices involved in the tracking process. Subsequently, gating 150 forwards the new hypothesis set $h_i$ to filtering process 152. Filtering process 152 determines a smooth curve for each member of $h_i$. Such a smooth curve is more likely than a sharp turn from each point straight to the next point. Further, the filtering process 152 removes small errors that may occur in generating observations. Note that in performing these tasks, the filtering process 152 preferably utilizes a minimization of a least squares test of the points in a track hypothesis or a Kalman Filtering approach.

As noted above, the foregoing track extension process requires knowledge of a previous track. For the initial observations, the following gating process 158 and filtering process 160 determine the "previous track" based on initial observations. In determining the initial tracks, the points from the first observation set form the beginning points of all possible tracks. After observation data from the next observation set is received, sets of simple two point straight line tracks are defined. Then, promotion, gate formulation, and output step 162 determines a zone in which future extensions are possible. Note that filtering step 160 uses curve fitting techniques to smooth the track extensions depending upon the number of prior observations that have accumulated in each hypothesis. Further note that promotion, gate formulation and output process 162 also determines when sufficient observations have accumulated to form a basis for promoting the track to processes 150 and 152 as described above.

The output of each of the filtering processes 152 and 160 is a set of hypothetical track extensions. Each such extension contains the hypothetical initial conditions (from the previous track), the list of observations incorporated in the extension, and distance between each observation and the filtered track curve. Scoring process 154 determines the figure of merit or cost of an observation being an extension of a track. In one embodiment, the cost is based on the above-mentioned distance although the particular formula for determining the cost is not critical to the present invention. A preferred formula for determining the cost utilizes a negative log likelihood function in which the cost is the negative of the sum of: (a) the logs of the distances normalized by sensor standard deviation parameters, and (b) the log likelihoods for events related to: track initiation, track termination, track maneuver, false negatives and false positives. Note that track maneuvers are detected by comparing the previous track curve with the current extension. Further note that some of the other events related to, for example, false negatives and false positives are detected by analyzing the relative relationship of gap fillers in the hypothesis. Thus, after determining that one of these events occurred, a cost for it can be determined based upon suitable statistics tables and system input parameters. The negative log likelihood function is desirable because it permits effective integration of the useful components. Copies of the set of hypothetical track extensions which are scored are subsequently passed directly to one of the gate formulation and output steps 156 and 162. Note that the scoring process 154 also arranges the actual scores in a sparse matrix based upon observation identifiers, and passes them to k-dimensional assignment problem solving process 300.

The assignment solving process 300 is described below. Its output is simply the list of assignments which constitute the most likely solution of the problem described by Equation [1.1]. Note that both gate formulation and output processes 156 and 162 use (at different times) the list of assignments to generate the updated track history $T_i$ to eliminate or prune alternative previous hypotheses that are prohibited by the actual assignments in the list, and subsequently to output any required data. Also note that when one of the gate formulation and output processes 156 and 162 accomplish these tasks, the process will subsequently generate and forward the new set of gates for each remaining hypothesis and the processes will then be prepared to receive the next set of observations, In one embodiment, the loop described here will generate zones for a delayed set of observations rather than the subsequent set. This permits processes 156 and 162 to operate on even observation sets while the scoring step 154 and k-dimensional solving process operate on odd sets of observations, or vice versa.

The assignment solving process 300 permits the present invention to operate with window size of k–1 for k≧3. The upper limit on k depends only upon the computational power of the computer 106 and the response time constraints of system 100. The k–1 observation sets within the processing window plus the prior track history result in a k-dimensional Assignment Problem as described by Problem Formulation [1.1]. The present invention solves this generalized problem including the processes required to consider false positives and negatives, and also the processes required to consider sparse matrix problem formulations.

I. A FIRST EMBODIMENT OF THE k-DIMENSIONAL ASSIGNMENT SOLVER 300

Figure 4:
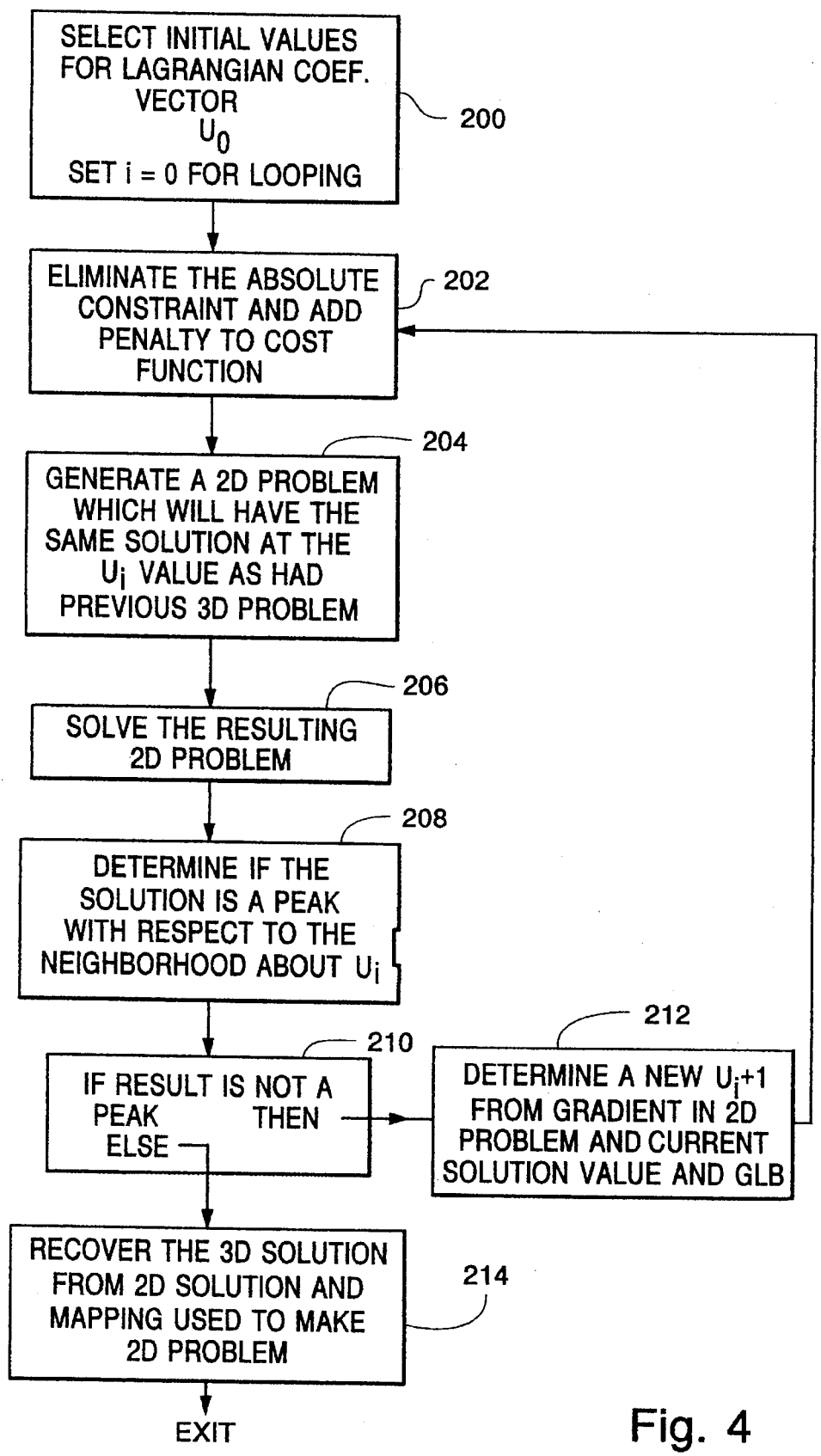
FIG. 4 is a flow chart of a process according to the prior art for solving a 3-dimensional assignment problem.

In describing a first embodiment of the k-dimensional assignment solver 300, it is worthwhile to also discuss the process of FIG. 4 which is used by the solver 300. FIG. 4 illustrates use of the Frieze and Yadagar process as shown in prior art for transforming a 3-dimensional assignment problem into a 2-dimensional assignment problem and then use a hill climbing algorithm to solve the 3-dimensional assignment problem. The solver 300 uses a Lagrangian Relaxation technique (well known in the art) to reduce the dimension of an original k-dimensional assignment problem (k>3) down to a 3-dimensional problem and then use the process of FIG. 4 to solve the 3-dimensional problem. Further note that the Lagrangian Relaxation technique is also utilized by the process of FIG. 4 and that in using this technique the requirement that each point is assigned to one and only one track is relaxed. Instead, an additional cost, which is equal to a respective Lagrangian Coefficient "u", is added to the cost or objective function [1.0](a) whenever a point is assigned to more than one track. This additional cost can be picked to weight the significance of each constraint violation differently, so this additional cost is represented as a vector of coefficients u which are correlated with respective observation points. Hill climbing will then develop a sequence of Lagrangian Coefficients sets designated $(u_0, \ldots, u_j, u_{j+1}, \ldots, u_p)$. That correspond to an optimum solution of the 2-dimensional assignment problem. The assignments at this optimum solution are then used to "recover" the assignment solution of the 3-dimensional assignment problem.

In step 200 of FIG. 4, initial values are selected for the $u_0$ coefficients, Because the Lagrangian Relaxation process is iterative, the initial values are not critical and are all initially selected as zero. In step 202, these additional costs are applied to the objective function [1.0](a). With the addition of the costs "u", the goal is still to assign the points which minimize the total cost. This transforms Equation [1.0](a), written for k=3 and altered to exclude mechanisms related to false positives and negatives, into objective function [2.1] (a), In the first iteration it is not necessary to consider the "u" matrix because all "u" values are set to zero. To relax the requirement that each point be assigned to one and only one track, the constraint Equation [1.0](d) is deleted, thereby permitting points from the last image to be assigned to more than one track. Note that while any axis can be chosen for relaxation, observation constraints are preferably relaxed. The effect of this relaxation is to create a new problem which must have the same solution in the first two axes but which can have a differing solution in the third axis. The result is constraints [2.1](b–d).

$$[2.1]$$
$$\text{(a) Minimize: } \sum_{i_1=0}^{N_1} \sum_{i_2=0}^{N_2} \{(c_{i_1 i_2 i_3} - u_{j_{i_3}})\} z_{i_1 i_2 i_3}$$

$$\text{(b) Subject to: } \sum_{i_2=1}^{N_2} \sum_{i_3=1}^{N_3} z_{i_1 i_2 i_3} = 1, i_1 = 1, \ldots N_1$$

$$\text{(c) } \sum_{i_1=1}^{N_1} \sum_{i_3=1}^{N_3} z_{i_1 i_2 i_3} \leq 1, i_2 = 1, \ldots N_2$$

$$\text{(d) } z_{i_1 i_2 i_3} \in \{0, 1\} \; \forall \; z_{i_1 i_2 i_3}$$

Step 204 then generates from the 3-dimensional problem described by Problem Formulation [1.0] a new 2-dimensional problem formulation which will have the same solution for the first two indices. As Problem Formulation [2.1] has no constraints on the $3^{rd}$ axis, any value within a particular 3-rd axis can be used in a solution, but using anything other than the minimum value from any 3-rd axis has the effect of increasing solution cost. Conceptually, the effect of step 204 is to change the 3-dimensional arrays in Problem Formulation [2.1] into 2-dimensional arrays as shown in Problem Formulation [2.2] and to generate the new 2-dimensional matrix $m_{i_1 i_2}$ defined as shown in Equation [2.3].

$$[2.2]$$
$$\text{(a) Minimize: } \sum_{i_1=0}^{N_1} \sum_{i_2=0}^{N_2} \left\{ \begin{array}{l} \text{Min:} \\ (c_{i_1 i_2 i_3} - u_{j_{i_3}}) \\ \forall \; i_3 \end{array} \right\} z_{i_1 i_2}$$

$$\text{(b) Subject to: } \sum_{i_2=1}^{N_2} \sum_{i_3=1}^{N_3} z_{i_2 i_3} = 1, i_1 = 1, \ldots N_1$$

$$\text{(c) } \sum_{i_1=1}^{N_1} \sum_{i_3=1}^{N_3} z_{i_1 i_3} \leq 1, i_2 = 1, \ldots N_2$$

$$\text{(d) } z_{i_1 i_2} \in \{0, 1\} \; \forall \; z_{i_1 i_2 i_3}$$

$$m_{i_1 i_2} = \text{Min: arg minimize}\{c_{i_1 i_2} - u_{j_i} | i = 1, \ldots, N_k\} \quad [2.3]$$

The cost or objective function for the reduced problem as defined by [2.2](a), if evaluated at all possible values of u is a surface over the domain of $U^3$. This surface is referred to as $\Phi(u)$ and is non-smooth but provable convex (i.e., it has a single peak and several other critical characteristics which form terraces). Because of the convex characteristics of $\Phi(u)$, the results from solving Problem Formulation [2.2] at any particular $u_j$ can be used to generate a new set of coefficients $u_{j+1}$ whose corresponding Problem Formulation [2.2] problem solution is a cost value closer to the peak of $\Phi(u)$. The particular set of Lagrangian Coefficients that will generate the 2-dimensional problem resulting in the maximum cost is designated $u_p$. To recover the solution to the 3-dimensional assignment problem requires solving the Equation 2.2 problem corresponding to $u_p$.

In step 206, the two dimensional problem is solved directly using a technique known to those skilled in the art such as Reverse Auction for the corresponding cost and solution values. This is the evaluation of one point on the surface or for the first iteration $\Phi(u_0)$.

Thus, after this first iteration, the points have been assigned based on all "u" values being arbitrarily set to zero. Because the "u" values have been arbitrarily assigned, it is unlikely that these assignments are correct and it is likely that further iterations are required to properly assign the points. Step 208 determines whether the points have been properly assigned after the first iteration by determining if for this set of assignments whether a different set of "u" values could result in a higher total cost. Thus, step 208 is implemented by determining the gradient of objective function [2.2](a) with respect to $u_j$. If the gradient is substantially non-zero (greater than a predetermined limit) then the assignments are not at or near enough to the peak of the $\Phi(u)$ surface (decision 210), and the new set of Lagrangian Coefficients $u_{j+1}$ are determined.

Hill climbing Step 212 determines the $u_{j+1}$ values based upon the $u_j$ values, the direction resulting from protecting the previous gradient into the $U^3$ domain, and a step size. The solution value of the 2-dimensional problem is the set of coefficients that minimize the 2-dimensional problem and the actual cost at the minimum. Those coefficients augmented by the coefficients stored in $m_{i_1 i_2}$ permit the evaluation (but not the minimization) of the cost term in Problem Formulation [2.1]. These two cost terms are lower and upper bounds on the actual minimized cost of the 3-dimensional problem, and the difference between them in combination with the gradient is used to compute the step size.

With this new set of "u" values, steps 202–210 are repeated as a second iteration. Steps 212 and 202–210 are repeated until the gradient as a function of u determined in step 208 is less than the predetermined limit. This indicates that the $u_p$ values which locate the peak area of the $\Phi(u)$ surface are determined and that the corresponding Problem Formulation [2.2] has been solved. Step 214 will attempt to use the assignments that resulted from this particular 2-dimensional assignment problem to recover the solution of the 3-dimensional assignment problem as described below. If the limit was chosen properly so that the "u" values are close enough to the peak, this recovery will yield the proper set of assignments that rigidly satisfies the constraint that each point be assigned to one and only one track. However, if the "u" values are not close enough to the peak, then the limit value for decision 210 is reduced and the repetition of steps 212 and 202–210 is continued.

Step 214 recovers the 3-dimensional assignment solution by using the assignment values determined on the last iteration through step 208. Consider the 2-dimensional z assignment matrix to have 1's in the locations specified by the list $L_1 = (a_i, b_i)_{i=1}^N$. If the 3-dimensional z matrix is specified by placing 1's at the location indicated by the list $L_2 = (a_i, b_i, m_{a_i b_i})_{i=1}^N$ then the result is a solution of Problem Formulation [2.1]. Let $L_3 = (m_{a_i b_i})_{i=1}^N$ be the list formed by the third index. If each member of $L_3$ is unique then the $L_2$ solution satisfies the third constraint so it is a solution to Problem Formulation [1.0]. When this is not the case, recovery determines the minimal substitutions required within list $L_3$ so that it plus $L_1$ will be a feasible solution, i.e., a solution which satisfies the constraints of a problem formulation, but which may not optimize the objective function of the problem formulation. This stage of the recovery process is formulated as a 2-dimensional assignment problem: Form a new cost matrix $[c_{i,j}]_{i,j=1}^{N}$ where $c_{i,j}=c_{a_ib_ij}$ for $j=1\ldots N_i$ and the $N_i$ term is the total number of cost elements in the selected row of the 3-dimensional cost matrix. Attempt to solve this 2-dimensional problem for the minimum using two constraints sets. If a feasible solution is found then the result will have the same form as list $L_1$. Replace the first set of indexes by the indicated $(a_i, b_i)$ pairs taken from list $L_1$ and the result will be a feasible solution of Problem Formulation [1.1]. If no feasible solution to the new 2-dimensional problem exists then further effort to locate the peak of $\Phi(u)$ is required.

I.1. Generalization to a Multi-Dimensional Assignment Solving Process

Let M be a fixed integer and assume that M is the dimension of the initial assignment problem to be solved. Thus, initially, the result of the scoring step 154 is a M-dimensional Cost Matrix which is structured as a sparse matrix (i.e., only a small percentage of the entries in the cost and assignment matrices are filled or non-zero). Individual cost elements represent the likelihood that a track $T_i$ as extended by the set of observations $\{o_{ij}|i=1,\ldots,M-1\}$, is not valid. Because the matrix is sparse the list of cost elements is stored as a packed list, and then for each dimension of the matrix, a vector of a variable length list of pointers to the cost elements is generated and stored. This organization means that for a particular observation $o_{ij}$ the $j^{th}$ list in the $i^{th}$ vector will be a list of pointers to all hypotheses in which $o_{ij}$ participates. This structure is further explained in the following section dealing with problem partitioning.

The objective of the assignment solving process is to select from the set of all possible combinations of track extensions a subset that satisfies two criteria. First, each point in the subset of combinations should be assigned to one and only one track and therefore, included in one and only one combination of the subset, and second, the total of the scoring sums for the combinations of the subset should be minimized. This yields the following M-dimensional equations where k=M:

(a) Minimize: $v_k(z^k) = \sum_{i_1=0}^{N_1} \ldots \sum_{i_k=0}^{N_k} c_{i_1\ldots i_k}^k z_{i_1\ldots i_k}^k$  [3.1]

(b) Subject to: $\sum_{i_2=0}^{N_2} \ldots \sum_{i_k=0}^{N_k} z_{i_1\ldots i_k}^k = 1 \; i_1=1,\ldots N_1$ (c) $\sum_{i_1=0}^{N_1} \ldots \sum_{i_{j-1}=0}^{N_{j-1}} \sum_{i_{j+1}=0}^{N_{j+1}} \ldots \sum_{i_k=0}^{N_k} z_{i_1\ldots i_k}^k = 1$ for $i_j = 1,\ldots N_j$ and
$j = 2,\ldots k-1$ (d) $\sum_{i_1=0}^{N_1} \ldots \sum_{i_{k-1}}^{N_{k-1}} z_{i_1\ldots i_k}^k = 1 \; i_k=1,\ldots N_k$ (e) $z_{i_1\ldots i_k}^k \in \{0,1\}$ for all $i_1\ldots i_k$ and where $c^k$ is the cost matrix $[c_{i_1\ldots i_k}^k]$ which ms a function of the distance between the observed point $z^k$ and the smoothed track determined by the filtering step, and $v_k$ is the cost function. This set of equations is similar to the set presented in Problem Formulation [1.1] except that it includes the subscript and superscript k notation. Thus, in solving the M-dimensional Assignment Problem the invention reduces this problem to an M–1 dimensional Assignment Problem and then to an N–2 dimensional Assignment Problem, etc. Further, the symbol $k\in\{3,\ldots,M\}$ customizes Problem Formulation [3.1] to a particular relaxation level. That is, the notation is used to reference data from levels relatively removed as in $c^{k+1}$ are the cost coefficients which existed prior to this level of relaxed coefficients $c^k$. Note that actual observations are numbered from 1 to $N_i$ where $N_i$ is the number of observations in observation set i. Further note that the added 0 observation in each set of observations is the unconstrained "gap filler." This element serves as a filler in substituting for missed detects, and a sequence of these elements including only one true observation represents the possibility that the observation is a false positive. Also note that by being unconstrained a gap filler may be used in as many hypotheses as required.

While direct solution to [3.1] would give the precise assignment, the solution of k-dimensional equations directly for large k is too complex and time consuming for practice. Thus, the present invention solves this problem indirectly.

The following is a short description of many aspects of the present invention and includes some steps according to the prior art. The first step in solving the problem indirectly is to reduce the complexity of the problem by the previously known and discussed Lagrangian Relaxation technique. According to the Lagrangian Relaxation technique, the absolute requirement that each point is assigned to one and only one track is relaxed such that for some one image, points can be assigned to more than one track. However, a penalty based on a respective Lagrangian Coefficient $u^k$ is added to the cost function when a point in the image is assigned to more than one track. The Lagrangian Relaxation technique reduces the complexity or "dimension" of the formulation of the assignment problem because constraints on one observation set are relaxed. Thus, the Lagrangian Relaxation is performed iteratively to repeatedly reduce the dimension until a 2-dimensional penalized cost function problem results as in Problem Formulation [2.1]. This 2-dimensional problem is solved then directly by a previously known technique such as Reverse Auction. The penalized cost function for the 2-dimensional problem defines a valley or convex shaped surface which is a function of various sets of $\{u^k|k=3,\ldots,M\}$ penalty values and one set of assignments for the points in two dimensions. That is, for each particular $u^3$ there is a corresponding 2-dimensional penalized cost function problem and its solution. Note that the solution of the 2-dimensional penalized cost function problem identifies the set of assignments for the particular $u^3$ values that minimize the penalized cost function. However, these assignments are not likely to be optimum for any higher dimensional problem because they were based on an initial arbitrary set of $u_k$ values. Therefore, the next step is to determine the optimum assignments for the related 3-dimensional penalized cost function problem. There exists a 2-dimensional hill shaped function $\Phi$ which is a graph of the minimums of all penalized cost functions at various sets of assignments in 2-dimensions. For the 3-dimensional problem, the $\Phi$ function can be defined based on the solution to the foregoing 2-dimensional penalized cost function. By using the current $u^3$ values and the $\{u^k|k>3\}$ values originally assigned. Then, the gradient of the hill-shaped $\Phi$ function is determined, which gradient points toward the peak of the hill. By using the gradient and $u^3$ values previously selected for the one point on the hill (corresponding to the minimum of the penalized cost $\Phi$ function) as a starting point, the $u^3$ values can be found for which the corresponding problem will result in the peak of the $\Phi$ function. The solution of the corresponding 2-dimensional problem is the proper values for 2 of the 3 set of indices in the 3-dimensional problem. These solution indices can select a subsection of the cost array which maps to a 2-dimensional array. The set of indices which minimize the 2-dimensional assignment problem based on that array corresponds to the proper assignment of points in the third dimension. The foregoing "recovery" process was known in the prior art, but it is modified here to adjust for the sparse matrix characteristic. The next task is to recover the solution of the proper $u^4$ values for the 4-dimensional problem. The foregoing hill climbing process will not work again because the foregoing hill climbing process when required to locate the 4-dimensional $u^4$ values for the peak of $\Phi^3$ requires the exact definition of the $\Phi^3$ function (as was available in the case of $\Phi^2$) or an always less than approximation of $\Phi^3$, whereas the iteration can result in a greater than approximation of $\Phi^3$. According to the present invention, another 3-dimensional function $\Psi$ is defined which is a "less than approximation" the 3-dimensional $\Phi$ function and which can be defined based on the solution to the 2-dimensional penalized cost function and the previously assigned and determined $u^k$ values. Next, the gradient of the $\Psi$ function is found and hill climbing used to determine the $u^4$ values at the peak. Each selected $u^4$ set results in a new 3-dimensional problem and requires the 2-dimensional hill climbing based upon new 2-dimensional problems. At the peak of the 3-dimensional $\Psi$ function, the solution values are a subset of the values required for the 4-dimensional solution. Recovery processing extends the subset to a complete solution. This process is repeated iteratively until the $u^k$ values that result in a corresponding solution at the peak of the highest order $\Psi$ and $\Phi$ functions are found. The final recovery process then results in the solution k-dimensional problem.

Figure 5:
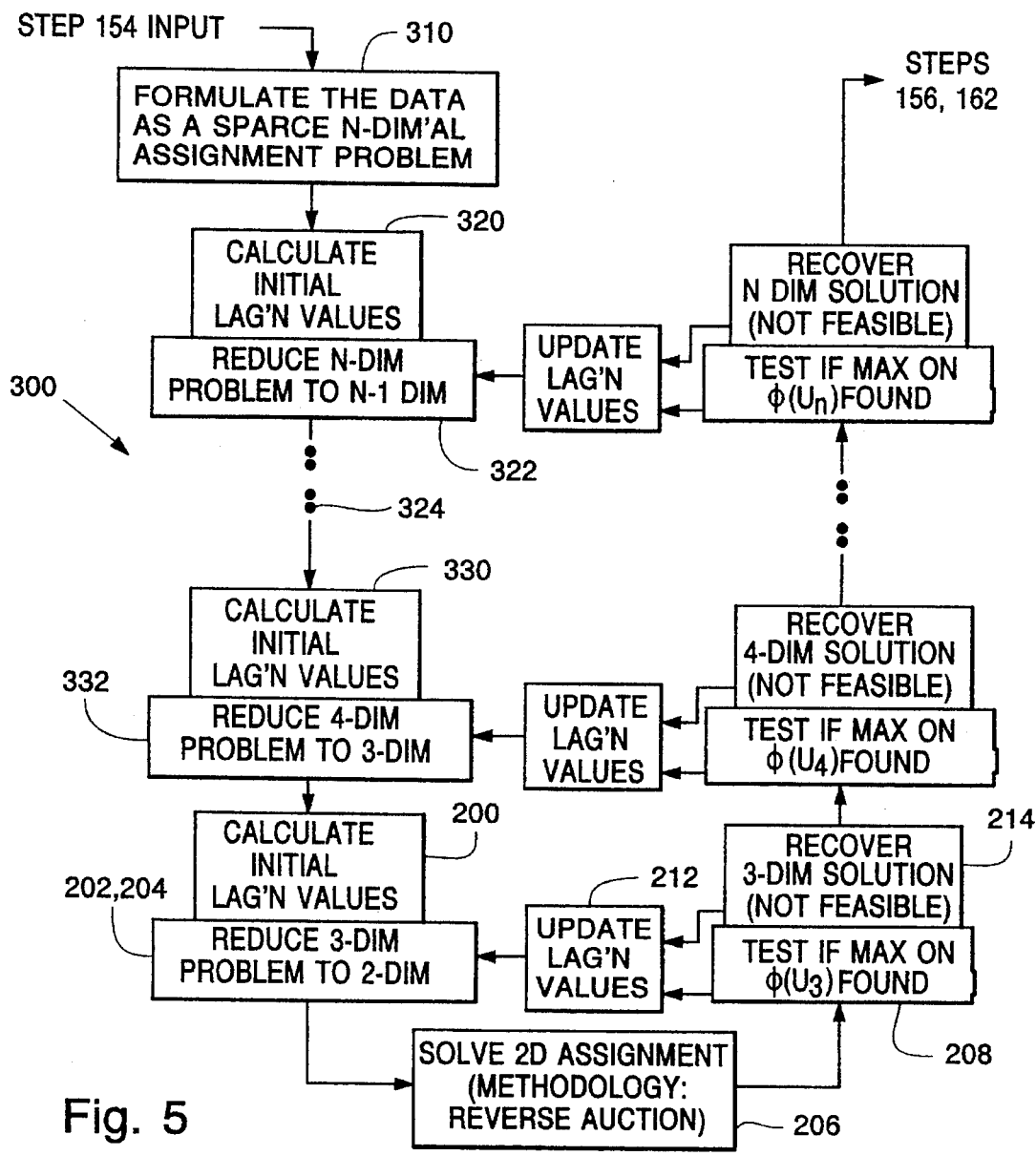
FIG. 5 is a flow chart of a process according to the present invention for solving a k-dimensional assignment problem where "k" is greater than or equal to 3.

FIG. 5 illustrates process 300 in more detail.

I.2. Problem Formulation

In problem formulation step 310, all data structures for the subsequent steps are allocated and linked by pointers as required for execution efficiency. The incoming problem is partitioned as described in the subsequent section. This partitioning has the effect of dividing the incoming problem into a set of independent problems and thus reducing the total workload. The partitioning process depends only on the actual cost matrix so the partitioning can and is performed for all levels of the relaxation process.

I.2.1. Relaxation and Recovery

Step 320 begins the Lagrangian Relaxation process for reducing the M-dimensional problem by selecting all Lagrangian Coefficient $u^M$ penalty values initially equal to zero. The Lagrangian Coefficients associated with the $M^{th}$ constraint set are a $N_M+1$ element vector. The reduction of this M-dimensional problem in step 322 to a M−1 dimensional problem uses the two step process described above. First, a penalty based on the value of the respective $u^M$ coefficient is added to the cost function when a point is assigned to more than one track and then the resultant cost function is minimized. However, during the first iteration, the penalty is zero because all $u^M$ values are initially set to zero. Second, the requirement that no point from any image can be assigned to more than one track is relaxed for one of the images. In the extreme this would allow a point from the relaxed image to associate with every track. However, the effect of the previous penalty would probably mean that such an association would not minimize the cost. The effect of the two steps in combination is to remove a hard constraint while adding the penalty to the cost function so that it operates like a soft constraint. For step 322 this two step process results in the following penalized cost function problem with k=M:

(a) $\Phi_k(u^k) \equiv$ Minimize: $\phi_k(u^k, z^k)$ [3.2]

-continued $$= \sum_{i_1=0}^{N_1} \cdots \sum_{i_k=0}^{N_k} c_{i_1 \ldots i_k}^k z_{i_1 \ldots i_k}^k -$$

$$\sum_{i_k=0}^{N_k} u_{i_k}^k \left[ \sum_{i_1=0}^{N_1} \cdots \sum_{i_{k-1}=0}^{N_{k-1}} z_{i_1 \ldots i_k}^k - 1 \right]$$

$$= \sum_{i_1=0}^{N_1} \cdots \sum_{i_k=0}^{N_k} (c_{i_1 \ldots i_k}^k - u_{i_k}^k) z_{i_1 \ldots i_k}^k +$$

$$\sum_{i_k=0}^{N_k} u_{i_k}^k$$

(b) Subject to: $\sum_{i_2=0}^{N_2} \cdots \sum_{i_k=0}^{N_k} z_{i_1 \ldots i_k}^k = 1 \; i_1 = 1, \ldots N_1$ (c) $\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1 \ldots i_k}^k = 1$ for $i_j = 1, \ldots N_j$ and
$j = 2, \ldots k-1$ (d) $z_{i_1 \ldots i_k}^k \in \{0, 1\}$ for all $i_1 \ldots l_k$ Because the constraint on single assignment of elements from the last image has been eliminated, a M−1 dimensional problem can be developed by eliminating some of the possible assignments. As shown in Equations [3.3], this is done by selecting the smallest cost element from each of the $M^{th}$ axis vectors of the cost matrix. Reduction in this manner yields a new, lower order penalized cost function defined by Equations [3.3] which has the same minimum cost as does the objective function defined by [3.2](a) above.

The cost vectors are selected as follows. Define an index array $m_{i_1 \ldots i_{k-1}}^k$ and new cost array $c_{i_1 \ldots i_{k-1}}^{k-1}$ by:

$m_{i_1 \ldots i_k}^k =$ Min: [3.3]
arg minimize $\{c_{i_1 \ldots i_k}^k - u_{i_k}^k | i_k = 0, 1, \ldots, N_k\}$ $c_{i_1 \ldots i_{k-1}}^{k-1} = c_{i_1 \ldots i_{k-1}}^k m_{i_1 \ldots i_k}^k$ for $(i_1, \ldots, i_{k-1}) \neq (0, \ldots, 0)$ $c_{0, \ldots, 0}^{k-1} = \sum_{i_k=0}^{N_k} \min \{0, c_{0 \ldots 0}^k - u_{i_k}^k\}$ The resulting M−1 dimensional problem is (where k=M):

$\Phi_k(u^k) =$ Minimize: $v_{k-1}(z^{k-1}) =$ [3.4]

$\sum_{i_1=0}^{N_1} \cdots \sum_{i_{k-1}=0}^{N_{k-1}} c_{i_1 \ldots i_{k-1}}^{k-1} z_{i_1 \ldots i_{k-1}}^{k-1}$ Subject to: $\sum_{i_2=0}^{N_2} \cdots \sum_{i_k=0}^{N_k} z_{i_1 \ldots i_k}^{k-1} = 1 \; i_1 = 1, \ldots N_1$ $\sum_{i_1=0}^{N_1} \cdots \sum_{i_{j-1}=0}^{N_{j-1}} \sum_{i_{j+1}=0}^{N_{j+1}} \cdots \sum_{i_k=0}^{N_k} z_{i_1 \ldots i_k}^{k-1} = 1$ for $i_j = 1, \ldots N_j$ and
$j = 2, \ldots k-1$ $\sum_{i_1=0}^{N_1} \cdots \sum_{i_{k-2}=0}^{N_{k-2}} z_{i_1 \ldots i_{k-1}}^{k-1} = 1 \; i_{k-1} = 1, \ldots N_{k-1}$ $z_{i_1 \ldots i_k}^k \in \{0, 1\}$ for all $i_1 \ldots l_{k-1}$ Assignment Problem [3.1] and Problem Formulation [3.4] differ only in the dimension M vs. M−1, respectively. An optimal solution to [3.4] is also an optimal solution to equation [3.2]. This relationship is the basis for an iterative sequence of reductions indicated by steps 320–332 through 330–332 and 200–204 in which the penalized cost function problem is reduced to a two dimensional problem. As these formula will be used to describe the processing at all levels, the lowercase k is used except where specific reference to the top level is needed. In step 206, the 2-dimensional penalized cost function is solved directly by the prior art Reverse Auction technique. Each execution of 206 produces two results, the set of $z^2$ values that minimize the problem and the cost that results $v^2$ when these z values are substituted into the objective function [3.4](a).

In step 208, according to the prior art, solution $z^2$ values are substituted into the 2-dimensional derivative of the $\Phi_2$ surface. The result indicates how the value of $u^3$ should be adjusted so as to perform the hill climbing function. As was previously described the objective is to produce a sequence of $u_i^3$ values which ends when the $u_p^3$ value in the domain of the peak of the $\Phi$ surface. The section "Determining Effective Gradient" describes how new values are computed and how it is determined that the current $u_i^k$ points to the peak of $\Phi_2$. When no further adjustment is required the flow moves to step 214 which will attempt to recover the 3-dimensional solution as previously described. When further adjustment is required then the flow progresses to step 212 and the new values of $u^k$ are computed. At the 2-dimensional level the method of the prior art could be used for the hill climbing procedure. However, it is not practical to use this prior art hill climbing technique to determine the updated Lagrangian Coefficients $u^k$ or the Max on the next (or any) higher order $\Phi$ surface because the next (or any) higher dimensional $\Phi$ function cannot be defined based on known information.

Figure 6:
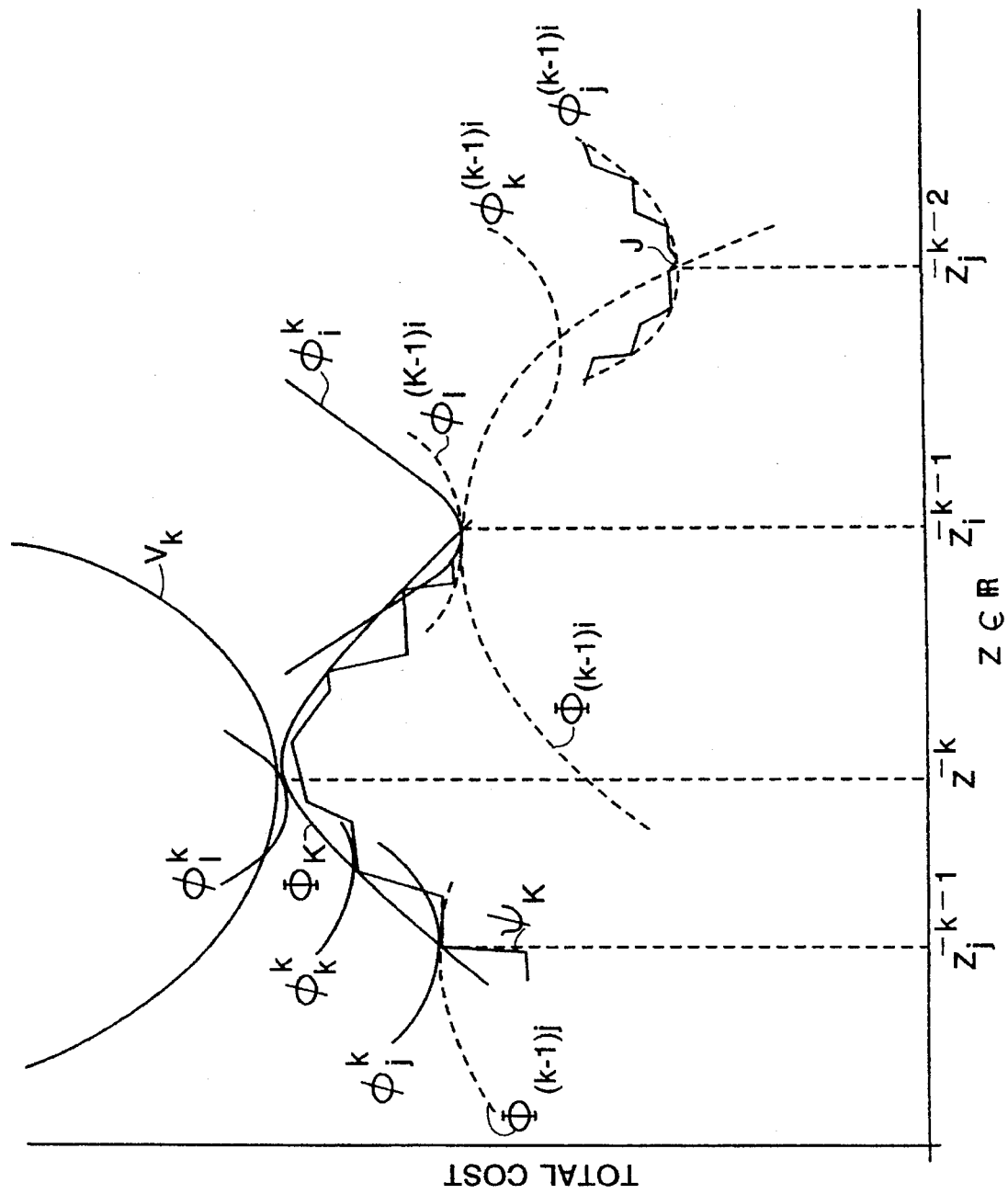
FIG. 6 is a graph of various functions used to explain the present invention.

Instead, the present invention defines a new function based on known information which is useful for hill climbing from the third to the fourth and above dimensions, i.e., $u^k$ values which result in z values that are closer to the proper z values for the highest k-dimension. This hill climbing process (which is different than that used in the prior art of FIG. 4 for recovering only the three dimensional solution) is used iteratively at all lower dimensions k of the M-dimensional problem (including the 3-dimensional level where it replaces prior art) even when k is much larger than three. FIG. 6 helps to explain this new hill climbing technique and illustrates the original. k-dimensional cost function $v_k$ of Problem Formulation [3.1]. However, the actual k-dimensional cost surface $v_k$ defined by [3.1](a) comprises scalar values at each point described by k-dimensional vectors and as such can not be drawn. Nevertheless, for illustration purposes only, FIG. 6 ignores the reality of ordering vectors and illustrates a concave function $v_k(z^k)$ to represent Equation 3.1. The $v_k$ surface is illustrated as being smooth to simplify the explanation although actually it can be imagined to be terraced. The goal of the assignment problem is to find the values of $\bar{z}^k$; these values minimize the k-dimensional cost function $v_k$.

For purposes of explanation, assume that in FIG. 6, k=4 (the procedure is used for all k≧3). This problem is reduced by two iterations of Lagrangian Relaxation to a 2-dimensional penalized cost function $\phi_j^{(k-1)i}$. This cost function and all other cost functions described below are also non-smooth and continuous but are illustrated in FIG. 6 as smooth for explanation purposes. Solving the $\phi_j^{(k-1)}$ problem results in one set of $z^2$ assignments and the value of $\Phi_{(k-1)i}$ at the point $u_{ij}^2$. A series of functions $\phi_j^{(k-1)i}, \ldots, \phi_l^{(k-1)i}$ each generated from a different $u^3$ are shown. The particular series illustrates the process of locating the peak of $\Phi_{(k-1)i}$. The 2-dimensional penalized cost functions $\phi_j^{(k-1)i}, \ldots, \phi_l^{(k-1)i}$ can be solved directly. Each such solution provides the information required to calculate the next $u^3$ value. Each iteration of the hill climbing improves the selection of $u^3$ values, i.e., yields $\phi^2$ problem whose solution is closer to those at the solution of the $\phi^3$ problem. The result of solving $\phi_l^{(k-1)i}$ is values that are on both $\Phi_{(k-1)i}$ and $\Phi_k$. FIG. 6 illustrates the $\Phi_k$ surface which comprises the minimums of all k-dimensional penalized cost function $\phi_k$ surfaces, i.e., if the Problem Formulations [3.2] and [3.4] were solved at all possible values of $u^k$ the function $\Phi_k(u_k)$ would result. The $\Phi_k$ surface is always less than the $v_k$ surface except at the peak as described in Equation 3.5 and its maximum occurs where the $v_k$ surface is minimum. Because the $\Phi_k$ surface represents the minimums of the $\phi_k$ surface, any point on the $\Phi_k$ surface can mapped to the $v_k$ surface. The $\Phi_k$ function provides a lower bound on the minimization problem described by [3.1](a). Let $\bar{z}^k$ be the unknown solution to Problem Formulation [3.1] and note that:

$$\Phi^k(u^k) \leq v_k(\bar{z}^k) \leq v_{k-1}(z^k) \quad [3.5]$$

Consequently, the $z^k$ values at the peak of $\Phi_k$ (i.e., the greatest lower bound on the cost of the relaxed problem), can be substituted into the k-dimensional penalized cost function to determine the proper assignments. Consequently, the present invention attempts to find the maximum on the $\Phi_k$ surface. However, it is not possible to use the prior art hill climbing to hill climb to the peak of $\Phi_k$ because the definition of $\Phi_k$ requires exact knowledge of lower order $\Phi$ functions. As the solution of $\phi_1^k$ is not exact the solution, in that higher order u values are not yet optimized, its value can be larger than the true peak of $\Phi_k$. As such it is not a lower bound on $v_k$ and it can not be used to recover the required solution.

Instead, the present invention defines all auxiliary function $\Psi_k$ which is based only on the solution to the 2-dimensional penalized cost function problem, lower order $z^k$ values and $u^k$ values determined previously by the reduction process. The $\Psi_k$ function is a less than approximation of $\Phi_k$, and its gradient is used for hill climbing to its peak. The $z^k$ values at the peak of the $\Psi_k$ function are then substituted into Problem Formulation [3.2] to determine the proper assignments. To define the $\Psi_k$ function, the present invention explicitly makes the function $\Phi_k(u^k)$ a function of all higher order sets of Lagrangian Coefficients with the expanded notation: $\Phi_k(u^k; u^{k-1}, \ldots, u^K)$. Then, a new set of $\Psi$ functions, is defined recursively, using the $\Phi_k$'s domain.

$$\Psi_3(u^3) = v_2 + \sum_{i_3=0}^{N_3} u_{i_3}^3 = \Phi_3(u^3; u^4, \ldots, u^K) \quad [3.6]\,(a)$$

where $v_2$ is the solution value for the most recent 2-dimensional penalized cost function problem. For k>3

$$\Psi_k(u^3, \ldots, u^{k-1}; u^k) = \quad [3.6]\,(b)$$

$$\begin{cases} \Phi_k(u^k; u^{k+1}, \ldots, u^K) & \text{If known} \\ \Psi_{k-1}(u^3, \ldots, u^{k-2}; u^{k-1}) + \sum_{i_k=0}^{N_k} u_{i_k}^k & \text{otherwise} \end{cases}$$

From the definition of $\Phi_k$ and $v_k$ (Problem Formulation [3.4] compared with Problem Formulation [3.2]):

$$\Phi_k(u^k; u^{k+1}, \ldots, u^M) = v_{k-1}(z^{k-1}) + \sum_{i_k=0}^{N_k} u_{i_k}^k$$

it follows that:

-continued $$\Psi_3(u^3) = v_2 + \sum_{i_3=0}^{N_3} u_{i_3}^3 = \Phi_3(u^3; u^4, \ldots, u^M) \leq v_3^3(z^3)$$

and with that Equation 3.5 is extended to:

$$\Psi_k(u^3, \ldots, u^{k-1}; u^k) \leq \Phi_k(u^k; u^{k-1}, \ldots, u^M) \leq v_k(\bar{u}^k) \leq v_k(u^k) \quad [3.7]$$

This relationship means that either $\Phi_k$ or $\Psi_k$ may be used in hill climbing to update the Lagrangian Coefficients u. $\Phi_k$ is the preferred choice, however it is only available when the solution to Problem Formulation [3.2] is a feasible solution to Problem Formulation [3.1] (as in hill climbing from the second to third dimension which is why prior art worked). For simplicity in implementations the function $\Psi_k$ is defined so that it equals $\Phi_k$ when either function could be used. It is therefore always used, even for hill climbing from the second dimension. The use of the $\Psi$ function which is based on previously assigned or determined u values and not higher order u values which are not yet determined, is an important feature of the present invention.

I.2.2. Determining Effective Gradient

After the $\Psi_k$ function is defined, the next steps of hill climbing/peak detection are to determine the gradient of the $\Psi_k$ function, determine an increasing portion of the gradient and then move up the $\Psi_k$ surface in the direction of this increasing portion of the gradient. As shown in FIG. 6, any upward step on the $\Psi_k$ surface, for example to the minimum of the $\phi_{kj}$ will yield a new set of $u^k$ values (to the "left") that is closer to the ideal set of $u^k$ values which correspond to the minimum of the $v_k$ function. While it is possible to iteratively step up this $\Psi_k$ surface with steps of fixed size and then determine if the peak has been reached, the present invention optimizes this process by determining the single step size from the starting point at the minimum of $\phi_{k_i}$ that will jump to the peak and then calculating the $u^k$ values at the peak. Once the f."u" s u at the peak at $\Psi_k$ are determined, then the $u^k$ values can be substituted into Problem Formulation [3.2] to determine the proper assignment. (However, in a more realistic example, where k is much greater than three, then the $u^k$ values at the peak of the $\Psi$ function along with the lower order $u^k$ values and those assigned and yielded by the reduction steps are used to define the next higher level $\Psi$ function. This definition of a higher order $\Psi$ function and hill climbing process are repeated iteratively until $\Psi_k$, and the peak of $\Psi_k$ and the $u^k$ values at the peak of $\Psi_k$ are identified.) The following is a description of how to determine the gradient of each $\Psi$ surface and how to determine the single step size to jump to the peak from the starting point on each $\Psi$ surface.

As noted above, each $\Psi$ surface is non-smooth. Therefore, if a gradient were taken at a single point, the gradient may not point toward the peak. Therefore, several gradients (a "bundle") are determined at several points on the $\Psi_k$ surface in the region of the starting point (i.e., minimum of $\phi_{k_i}$) and then averaged. Statistically, the averaged result should point toward the peak of the $\Psi_k$ surface. Wolfe's Conjugate Subgradient Algorithm (Wolfe75, Wolfe79) for minimization was previously known in another environment to determine a gradient of a non-smooth surface using multiple subgradients and can be used with modification in the present invention. Wolfe's algorithm is further described in "A Method of Conjugate Subgradients for Minimizing Non-differentiable Functions" page 147–173 published by Mathematical Programming Study 3 in 1975 and "Finding the Nearest Point in a Polytope" page 128–149 published by Mathematical Programing Study 11 in 1976. The modification to Wolfe's algorithm uses the information generated for $\Psi_k(u^{k3}, \ldots, u^{kk-2}; u^{kk-1})$ as the basis for calculating the subgradients. The definition of a subgradient v of $\Psi_k(u^{k3}, \ldots, u^{kk})$ is any member of the subdifferential set defined as:

$$\delta\Psi_k(u) = \{v \in R^{N_k+1} | (\Psi_k(u^{k3}, \ldots, u^{kk-1}; u') - \Psi_k(u^{k3}, \ldots, u^{k-1}; u^k)) \geq v^T(u' - u^k) \; \forall u' \in R^{N_k+1} \}$$

(where $v^T$ is the transpose of v)

Next, a subgradient vector is determined from this function. If $z^k$ is the solution of Problem Formulation [3.2], then differentiating $\Psi_k(u^3, \ldots, u^{k-1}; u^k)$ with respect to $u_{i_k}^k$ and evaluating the result with respect to the current selection matrix $z^k$ yields a subgradient vector:

$$g = \left(0, \left(1 - \sum_{i_1=0}^{N_1} \ldots \sum_{i_{k-1}=0}^{N_k} z_{i_1, \ldots, i_k}^k \middle| i_k = 1, \ldots, N_k \right)\right)$$

The iterative nature of the solution process at each dimension yields a set of such subgradients. Except for a situation described below where the resultant averaged gradient does not point toward the peak, the most recent set of such subgradients are saved and used as the "bundle" for the peak finding process for this dimension. For example, at the k level there is a bundle of subgradients of the $\Psi_k$ surface near the minimum of the $\phi_{k_i}$ surface determined as a result of solving Problem Formulation [3.1] at all lower levels. This bundle can be averaged to approximate the gradient. Alternately, the previous bundle can be discarded so as to use the new value to initiate a new bundle. This choice provides a way to adjust the process to differing classes of problems, i.e., when data is being derived from two sensors and the relaxation proceeds from data derived from one sensor to the other then the prior relaxation data for the first sensor could be detrimental to performance on the second sensors data.

I.2.3. Step Size and Termination Criterion

After the average gradient of the $\Psi_k$ surface is determined, the next step is to determine a single step that will jump to the peak of the $\Psi_k$ surface. The basic strategy is to first specify an arbitrary step size, and then calculate the value of $\Psi_k$ at this step size in the direction of the gradient. If the $\Psi_k$ value is larger than the previous one, this probably means that the step has not yet reached the peak. Consequently, the step size is doubled and a new $\Psi_k$ value determined and compared to the previous one. This process is repeated until the new $\Psi_k$ value is less than the previous one. At that time, the step has gone too far and crossed over the peak. Consequently, the last doubling is rolled-back and that step size is used for the iteration. If the initial estimated $\Psi_k$ is less than previous value then the step size is decreased by 50%. If this still results in a smaller $\Psi_k$ value then the last step is rolled back and the previous step size is decreased by 25%. The following is a more detailed description of this process.

With a suitable bundle of subgradients determined as just described. Wolfe's algorithm can be used to determine the effective subgradient (d) and the Upgraded value $u_{j+1}^k$. From the previous iteration, or from an initial condition, there exists a step length value (t). The value, $$u_+ = u_j^k + td$$

is calculated as an estimate of $u_{j+1}^k$. To determine if the current step size is valid the we evaluate $\Psi_k(u^3, \ldots, u^{k-2}; u_+)$. If the result represents an improvement then we double the step size. Otherwise we halve the step size. In either case a new $u_+$ is calculated. The doubling or halving continues until the step becomes too large to improve the result, or until it becomes small enough to not degrade the result. The resulting suitable step size is saved with d as part of the subgradient bundle. The last acceptable $u_+$ is assigned to $u_{j+1}^k$.

Three distinct criterion are used to determine when $u_j^k$ is close enough to $\bar{u}^k$:

1. The Wolfe's algorithm criterion of d=0 given that the test has been repeated with the bundle containing only the most recent subgradient.
2. The difference between the lower bound $\Phi_k(u^k)$ and the upper bound $v_k(z^k, u^k)$ being less than a preset relative threshold. (Six percent was found to be an effective threshold for radar tracking problems.)
3. An iteration count being exceeded.

The use of limits on the iteration are particularly effective for iterations at the level 3 through n−1 levels, as these iterations will be repeated so as to resolve higher order coefficient sets. With limited iterations the process is in general robust enough to improve the estimate of upper order Lagrangian Coefficients. By limiting the iteration counts then the total processing time for the algorithm becomes deterministic. That characteristic means the process can be effective for real time problems such as radar, where the results of the last scan of the environment must be processed prior to the next scan being received.

I.2.4. Solution Recovery

The following process determines if the $u^k$ values at what is believed to be the peak of the $\Psi_k$ function adequately approximate the $u^k$ values at the peak of the corresponding $\Phi_k$ function. This is done by determining if the corresponding penalized cost function is minimized. Thus, the $u^k$ values at the peak of the $\Psi_k$ function are first substituted into Problem Formulation [3.2] to determine a set of z assignments for k−1 points. During the foregoing reduction process, Problem Formulation [3.4] yielded a tentative list of k selected z points that can be described by their indices as:

$$\{(i_1^j \ldots i_{k-1}^j)\}_{j=1}^{N_0},$$

where $N_0$ is the number of cost elements selected into the solution. One possible solution of Problem Formulation [3.1] is the solution of Problem Formulation [3.2] which is described as $\{(i_1^j \ldots i_{k-1}^j m_{i_1 \ldots i_{k-1}}^k \ldots i_{k-1})\}_{j=1}^{N_0}$ with $m_{i_1 \ldots i_{k-1}}^k$ as it was defined in Problem Formulation [3.3].

If this solution satisfies the k-th constraint set then it is the optimal solution.

However, if the solution for Problem Formulation [3.2] is not feasible (decision 355), then the following adjustment process determines if a solution exists which satisfies the k-th constraint while retaining the assignments made in solving Problem Formulation [3.4]. To do this, a 2-dimensional cost matrix is defined based upon all observations from the k-th set which could be used to extend the relaxed solution.

$$h_{jl} = c_{i_1 \ldots i_{k-1}, l}^k \quad [3.8]$$

for $l = 0, \ldots, N_k$ and $j = 0, \ldots, N_0$

If the resulting 2-dimensional assignment problem, $$\text{Minimize:} \sum_{j=0}^{N_0} \sum_{l=0}^{N_l} h_{jl} w_{jl} \quad [3.9]$$

$$\text{Subject to:} \sum_{l=0}^{N_k} w_{jl} = 1 \ j = 1, \ldots, N_0$$

$$\sum_{l=0}^{N_k} w_{jl} = 1 \ j = 1, \ldots, N_0$$

$$w_{jl} \in \{0, 1\} \ j = 0, \ldots, N_0, l = 0, \ldots, N_k$$

has a feasible solution then the indices of that solution map to the solution of Problem Formulation [3.1] for the k-dimensional problem. The first index in each resultant solution entry is the pointer back to an element of the $\{(i_1^j \ldots i_{k-1}^j m_{i_1 \ldots i_{k-1}}^k)\}_{j=1}^{N_0}$ list. That element supplies the first k−1 indices of the solution. The second index of the solution to the recovery problem is the $k^{th}$ index of the solution. Together these indexes specify the values of $z^k$ that solve Problem Formulation [3.1] at the $k^{th}$ level. If Problem Formulation [3.9] does not have a feasible solution then the value of $u_i^k$ which was thought to represent $u_p^k$ is not representative of the actual peak and further iteration at the $k^{th}$ level is required. This decision represent the branch path from step 214 and equivalent steps.

I.3. Partitioning

A partitioning process is used to divide the cost matrix that results from the Scoring step 154 into as many independent problems as possible prior to beginning the relaxation solution. The partitioning process is included with the Problem Formulation Step 310. The result of partitioning is a set of problems to be solved, i.e., there will be $p_1$ problems that consist of a single hypothesis, $P_2$ problems that consist of two hypothesis, etc. Each such problem is a group in that one or more observations or tracks are shared between members of the group.

In partitioning to groups no consideration is given to the actual cost values. The analysis depends strictly on the basis of two or more cost elements sharing the same specific axis of the cost matrix. In a 2-dimensional case two cost elements must be in the same group if they share a row or a column. If the two elements are in the same row, then each other cost element that is also in the same row, as well as any cost elements that are in columns occupied by members of the row must be included in the group. The process continues recursively. In literature it is referred to as "Constructing a Spanning Forest." The k-dimensional case is analogous to the 2-dimensional case. The specific method we have incorporated is a depth first search, presented by Aho, Hopecraft, and Ullman, in "Design and Analysis of Computer Algorithms," section 5.2, published by Addison-Westley, Mass.

The result of partitioning at level M is the set of problems described as $\{P_{ij}|i=1, \ldots, p_j$ and $j=1, \ldots N\}$, where N is the total number of hypothesis. The problems labeled $\{P_{i1}|i=1, \ldots, p_1\}$ are the cases where their is only one choice for the next observation at each scan and that observation could be used for no other track, i.e., it is a single isolated track. The hypothesis must be in included in the solution set and no further processing is required.

As hypothesis are constructed the first element is used to refer to the track id. Any problem in the partitioned set which does not have shared costs in the first scan represent a case where a track could be extended in several ways but none of the ways share an observation with any other track. The required solution hypothesis for this case is the particular hypothesis with the maximum likelihood. For this case all likelihoods are determined as was described in Scoring and the maximum is selected.

In addition to partitioning at the M level, partitioning is applied to each subsequent level M−1, . . . , 2. For each problem that was not eliminated by either by the prior selection partitioning is repeated, ignoring observations that are shared in the last set of observations. Partitioning recognizes that relaxation will eliminate the last constraint set and thus partitioning is feasible for the lower level problems that will result from relaxation. This process is repeated for all levels down to k=3. The full set of partitionings can be performed in the Problem Formulation Step 310, prior to initiating the actual relaxation steps. The actual 2-dimensional solver used in step 206 includes an equivalent process so no advantage would be gained by partitioning at the k=2 level.

There are two possible solution methods for the remaining problems. "Branch and Bound" as was previously described, or the relaxation method that this invention describes. If any of the partitions have 5–10 possible tracks and less than 50 to 20 hypotheses, then the prior art "Branch and Bound" algorithm generally executes faster than does the relaxation due to its reduced level of startup overhead. The "Branch and Bound" algorithm is executed against all remaining M level problems that satisfy the size constraint. For the remainder the Relaxation algorithm is used. The scheduling done in Problem Formulation allows each Problem Formulation [3.2] cost matrix resulting from the first step of relaxation to be partitioned. The resulting partitions can be solved by any of the four methods, isolated track direct inclusion, isolated track tree evaluation, small group "Branch and Bound" or an additional stage of relaxation as has been fully described.

The partitioning after each level of Lagrangian Relaxation is effective because when a problem is relaxed, the constraint that requires each point to be assigned to only one track is eliminated (for one image at a time). Therefore, two tracks previously linked by contending for one point will be unlinked by the relaxation which permits the point to be assigned to both tracks. The fruitfulness of partitioning increases for lower and lower levels of relaxation.

The following is a more detailed description of the partitioning method. Its application at all but the M level depends upon the relaxation process described in this invention. The recursive partitioning is therefore a distinct part of this invention. The advantage of this method is greatly enhanced by the sparse cost matrix resulting from tracking problems. However the sparse nature of the problem requires special storage and search techniques.

A hypothesis is the combination of the cost element $c_n$ the selection variable $z_n$ and all observations that made up the potential track extension. It can be written as, $h_n = \{c_n, z_n, \{o_{n_k} = o_k | k = 1, \ldots, M i \in \{1, \ldots, N_k\}\}\}$, i.e., cost, selection variable and observations in the hypothesis. $n \in \{1, \ldots, N\}$ where N is the total number of hypotheses in the problem. While the cost and assignment matrices were previously referenced, these matrices are not effective storage mechanisms for tracking applications. Instead the list of all hypothesis and sets of lists for each dimension that reference the hypothesis set are stored. The hypothetical set in list form is:

$$\{h_n\} \quad \begin{matrix} n = N \\ n = 1 \end{matrix}$$

For each dimension k=1 ... M there exists a set of lists, with each list element being a pointer to a particular hypothesis:

$$L_{k_i} = \{p_{k_j} | k_j = 1, \ldots, N_{k_i}\} \quad \begin{matrix} i = N_k, k = M \\ i = 1, k = 1 \end{matrix}$$

where $N_{k_i}$ is number of hypothesis containing the i-th observation from scan k. This structure is a multiply linked list in that any observation is associated with a set of pointer to all hypothesis it participates in, and any hypothesis has a set of pointers to all observations that formed it. (These pointers can be implemented as true pointers or indices depending upon the particular programming language utilized.)

Given this description of the matrix storage technique then the partitioning technique is as follows: Mark the first list $L_{k_i}$ and follow out all pointers in that list to the indicated hypothesis $h_{n_{k_i}}$ for i=1, ..., $N_{ki}$. Mark all located hypothesis, and for each follow pointers back the particular $L_{o_k}$ for k=1, ... M. Those L's if not previously marked get marked and also followed out to hypothesis elements and back to L's. When all such L's or h's being located are marked, then an isolated sub-problem has been identified. All marked elements can be removed from the lists and stored as a unique problem to be solved. The partitioning problem then continues by again starting at the first residual L set. When none remain, the original problem is completely partitioned.

Isolated problems can result from one source track having multiple possible extensions or from a set of source tracks contending for some observations. Because one of the indices of k (in our implementation it is k=1) indicate the source track then it is possible to categorize the two problem types by observing if the isolated problem includes more than one L-list from the index level associated with tracks.

I.4. Subsequent Track Prediction

As noted above, after the points are assigned to the respective tracks, some action is taken such as controlling take-offs and landings to avoid collision, advising airborne aircraft to change course, warning airborne aircraft of an adjacent aircraft in a commercial environment, or aiming and firing an anti-aircraft (or anti-missile) missile, rocket or projectile, or taking evasive action in a military environment. Also, the tracking can be used to position a robot to work on an object. For some or all of these applications, usually the tracks which have just been identified are extended or extrapolated to predict a subsequent position of the aircraft or other object. The extrapolation can be done in a variety of prior art ways; for example, straight line extensions of the most likely track extension hypothesis, parametric quadratic extension of the x versus time, y versus time, etc. functions that are the result of the filtering process described earlier, least square path fitting or Kalman filtering of just the selected hypothesis.

The process of gating, filtering, and gate generation as they were previously described require that a curve be fit through observations such that fit of observations to the likely path can be scored and further so that the hypothetical target future location can be calculated for the next stage of gating. In the implementation existing, quadratic functions have been fit through the measurements that occur within the window. A set of quadratics is used, one per sensor measurement. To calculate intercept locations these quadratics can be converted directly into path functions. Intercept times are then calculated by prior methods based upon simultaneous solution of path equations.

The use of the fitted quadratics is not as precise as more conventional filters like the Kalman Filter. They are however much faster and sufficiently accurate for the relative scores required for the Assignment problem. When better location prediction is required then the assignment problem is executed to select the solution hypothesis and based upon the observations in those hypothesis the more extensive Kalman filter is executed. The result is tremendous computation savings when compared with the Kalman Filter being run on all hypothetical tracks.

Based on the foregoing, apparatus and methods have been disclosed for tracking objects. However, numerous modifications and substitutions can be made without deviating from the scope of the present invention. For example, the foregoing $\Psi$ functions can also be defined as recurslye approximation problem in which several values of higher order $u^k$ values are used to eliminate the higher than approximation characteristic of the $\Phi_k$ function. The hill climbing of the $\Psi$ function can be implemented by a high order hill climbing using the enhanced $\Phi_k$ function. Although the result would not be as efficient it seems likely that the method would converge. Therefore, the invention has been disclosed by way of example and not limitation, and reference should be made to the following claims to determine the scope of the present invention.

II. AN ALTERNATIVE EMBODIMENT OF THE MULTI-DIMENSIONAL ASSIGNMENT SOLVING PROCESS

The following description provides an alternative second embodiment of the multi-dimensional assignment solving process of section I.1. However, in order to clearly describe the present alternative embodiment, further discussion is first presented regarding the data assignment problem of partitioning measurements into tracks and false alarms and, in particular, the representation of multi-dimensional assignment problems.

II.1. Formulation of the Assignment Problem

The goal of this section is to explain the formulation of the data association problems, and more particularly multi-dimensional assignment problems, that govern large classes of problems in centralized or hybrid centralized-sensor level multisensor/multitarget tracking. The presentation is brief; technical details are presented for both track initiation and maintenance in A. B. Poore, *Multi-dimensional assignment formulation of data association problems arising from multitarget tracking and multisensor data fusion*, Computational Optimization and Applications, 3 (1994), pp. 27–57, for nonmaneuvering targets and in Ingemar J. Cox, Pierre Hansen, and Beta Julesz, eds., *Partitioning Data Sets*, DIMACS Series in Discrete Mathematics and Theoretical Computer Science. American Mathematical Society, Providence, R.I., v. 19, Feb. 1995, pp. 169–198 for maneuvering targets. Note that the present formulation can also be modified to include target features (e.g., size and type) into the scoring process 154.

The data assignment problems for multisensor and multitarget tracking considered here are generally posed as that of maximizing the posterior probability of the surveillance region (given the data) according to $$\text{Maximize} \left\{ \frac{P(\Gamma = \gamma | Z^M)}{P(\Gamma = \gamma^0 | Z^M)} \;\middle|\; \gamma \in \Gamma^* \right\} \quad [5.1]$$

where $Z^M$ represents M data sets, $\gamma$ is a partition of indices of the data (and thus induces a partition of the data), $\Gamma^*$ is the finite collection of all such partitions, $\Gamma$ is a discrete random element defined on $\Gamma^*$, $\gamma^0$ is a reference partition, and $P(\Gamma = \gamma | Z^M)$ is the posterior probability of a partition $\gamma$ being true given the data $Z^M$. The term partition is defined below.

Consider M observation sets $Z(k)$ ($k=1, \ldots, N$) each of $N_k$ observations $\{z_{i_k}^k\}_{i_k=1}^{N_k}$, and let $Z^M$ denote the cumulative data set defined by $$Z(k) = \{z_{i_k}^k\}_{i_k=1}^{N_k} \text{ and } Z^M = \{Z(1), \ldots, Z(M)\}, \quad [5.2]$$

respectively. In multisensor data fusion and multitarget tracking the data sets $Z(k)$ may represent different classes of objects, and each data set can arise from different sensors. For track initiation the objects are measurements that must be partitioned into tracks and false alarms. In the formulation of track extensions a moving window over time of observations sets is used. The observation sets will be measurements which are: (a) assigned to existing tracks, (b) designated as false measurements, or (c) used for initiating tracks. However, note that alternative data objects instead of observation sets may also be fused such as in sensor level tracking wherein each sensor forms tracks from its own measurements and then the tracks from the sensors are fused in a central location. Note that, as one skilled in the art will appreciate, both embodiments of the present invention may be used for this type of data fusion.

The data assignment problem considered presently is represented as a case of set partitioning defined in the following way. First, for notational convenience in representing tracks, a zero index is added to each of the index sets in [5.2], a gap filler $z_0^k$ is added to each of the data sets $Z(k)$ in [5.2], and a "track of data" is defined as $(z_{i_1}^1, \ldots, z_{i_N}^N)$ where $i_k$ and $z_{i_k}^k$ can now assume the values of 0 and $z_0^k$, respectively. A partition of the data will refer to a collection of tracks of data or track extensions wherein each observation occurs exactly once in one of the tracks of data and such that all data is used up. Note that the occurrence of the gap filler is unrestricted The gap filler $z_0^k$ serves several purposes in the representation of missing data, false observations, initiating tracks, and terminating tracks. Note that a "reference partition" may be defined which is a partition in which all observations are declared to be false.

Next under appropriate independence assumptions it can be shown that:

$$\frac{P(\Gamma = \gamma | Z^M)}{P(\Gamma = \gamma^0 | Z^M)} \equiv L_\gamma \equiv \prod_{(i_1 \ldots i_N) \in \gamma} L_{i_1 \ldots i_M}, \quad [5.3]$$

where $L_{i_1 \ldots i_M}^k$ is a likelihood ratio containing probabilities for detection, maneuvers, and termination as well as probability density functions for measurement errors, track initiation and termination Then if $c_{i_1 \ldots i_N} = -\ln L_{i_1 \ldots i_M}^k$, $$-\ln\left[\frac{P(\gamma | Z^M)}{P(\gamma^0 | Z^M)}\right] = \sum_{(i_1, \ldots, i_M) \in \gamma} c_{i_1 \ldots i_N} \quad [5.4]$$

Using [5.3] and the zero-one variable $z_{i_1 \ldots i_N}^k = 1$ if $(i_1, \ldots i_M) \in \gamma$ and 0 otherwise, one can then write the problem [5.1] as the following M-dimensional assignment problem (as also presented in section Problem Formulation [3.1] with $k=M$):

(a) Minimize $\sum_{i_1=0}^{N_1} \ldots \sum_{i_M=0}^{N_M} c_{i_1 \ldots i_M} z_{i_1 \ldots i_M}$ [5.5]

(b) Subject to: $\sum_{i_2=0}^{N_2} \ldots \sum_{i_M=0}^{N_M} z_{i_1 \ldots i_M} = 1, i_1 = 1, \ldots, N_1,$ (c) $\sum_{i_1=0}^{N_1} \ldots \sum_{i_{k-1}=0}^{N_{k-1}} \sum_{i_{k+1}=0}^{N_{k+1}} \ldots \sum_{i_M=0}^{N_M} z_{i_1 \ldots i_M} = 1,$ for $i_k = 1, \ldots, N_k$ and $k = 2, \ldots, M-1,$ (d) $\sum_{i_1=0}^{N_1} \ldots \sum_{i_{N-1}=0}^{N_{M-1}} z_{i_1 \ldots i_M} = 1, i_M = 1, \ldots, N_M$ (e) $z_{i_1 \ldots i_M} \in \{0, 1\}$ for all $i_1, \ldots, i_M$ where $c_{0 \ldots 0}$ is arbitrarily defined to be zero. Here, each group of sums in the constraints [5.5](b)–[5.5](e) represents the fact that each non-gap filler observation occurs exactly once in a "track of data." One can modify this formulation to include multiassignments of one, some, or all the actual observations. The assignment problem [5.5] is changed accordingly. For example if $z_{i_k}^k$ is to be assigned no more than, exactly, or no less than $n_{i_k}^k$ times, then the "=1" in the appropriate one of the constraints [5.5](b)–[5.5](d) is changed to "$\leq, =, \geq n_{i_k}^k$," respectively.

Expressions for the likelihood ratios $L_{i_1 \ldots i_M}^k$ such as [5.5] are well known. In particular, discussions of these ratios may be found in: A. B. Poore, *Multi-dimensional assignment formulation of data association problems arising from multitarget tracking and multisensor data fusion,* Computational Optimization and Applications, 3 (1994), pp. 27–57; and Ingemar J. Cox, Pierre Hansen, and Beta Julesz, eds., *Partitioning Data Sets,* DIMACS Series in Discrete Mathematics and Theoretical Computer Science. American Mathematical Society, Providence, R.I., v. 19, 1995, pp. 169–198. Furthermore, the likelihood ratios are easily modified to include target features and to account for different sensor types. Also note that in track initiation, the M observation sets provide observations from M sensors, possibly all the same. Additionally note that for track maintenance, a sliding window of M observation sets and one data set containing established tracks may be used. In this latter case, the formulation is the same as above except that the dimension of the assignment problem is now M+1.

II.2. Overview of the New Lagrangian Relaxation Algorithms

Having formulated an M-dimensional assignment problem [5.5], we now turn to a description of the Lagrangian relaxation algorithm. Subsection II.2.1 below presents many of the relaxation properties associated with the relaxation of an n-dimensional assignment problem to an m-dimensional one via a Lagrangian relaxation of n–m sets of constraints wherein m<n≦M and preferably in the present invention embodiment n–m>1. Although any n–m constraint sets can be relaxed, the description here is based on relaxing the last n–m sets of constraints and keeping the first m sets. Given either an optimal or suboptimal solution of the relaxed problem, a technique for recovering a feasible solution of the n-dimensional problem is presented in subsection II.2.2 below and an overview of the Lagrangian relaxation algorithm is given in subsection II.2.3.

The following notation will be used throughout the remainder of the work. Let M be an integer such that M≧3 and let n∈{3, . . . , M}. The n-dimensional assignment problem is (a) Minimize: $v_n(z) = \sum_{i_1=0}^{N_1} \cdots \sum_{i_n=0}^{N_m} c_{i_1 \ldots i_n}^n z_{i_1 \ldots i_n}^n$  [6.1]

(b) Subject to: $\sum_{i_2=0}^{N_2} \cdots \sum_{i_n=0}^{N_m} z_{i_1 \ldots i_n}^n = 1, i_1 = 1, \ldots, N_1,$ (c) $\sum_{i_1=0}^{N_1} \cdots \sum_{i_{k-1}=0}^{N_{k-1}} \sum_{i_{k+1}=0}^{N_{k+1}} \cdots \sum_{i_n=0}^{N_m} z_{i_1 \ldots i_n}^n = 1,$ for $i_k = 1, \ldots, N_k$ and $k = 2, \ldots, n-1,$ (d) $\sum_{i_1=0}^{N_1} \cdots \sum_{i_{n-1}=0}^{N_{m-1}} z_{i_1 \ldots i_n}^n = 1, i_n = 1, \ldots, N_m,$ (e) $z_{i_1 \ldots i_n}^n \in \{0, 1\}$ for all $i_1, \ldots, i_n$ To ensure that a feasible solution of [6.1] always exists, all variables with exactly one nonzero index (i.e., variables of the form $z_0^n \ldots 0_{i_k} 0 \ldots 0$ for $i_k \neq 0$) are assumed free to be assigned and the corresponding cost coefficients are well-defined.

II.2.1. The Lagrangian Relaxed Assignment Problem

The n-dimensional assignment problem [6.1] has n sets of constraints. A $(N_k+1)$-dimensional multiplier vector associated with the k-th constraint set will be denoted by $u^k = (u_0^k, u_1^k, \ldots, u_{M_k}^k)^T$ with $u_0^k = 0$ and k=1, . . . , n. The n-dimensional assignment problem [6.1] is relaxed to an m-dimensional assignment problem by incorporating n–m of the n sets of constraints into the objective function [6.1](a). Although any constraint set can be relaxed, the description of the relaxation procedure for [6.1] will be based on the relaxation of the last n–m sets of constraints. The relaxed problem is $\Phi_{mn}(u^{m+1}, \ldots, u^n) \equiv$ Minimize  [6.2]

$\Phi_{mn}(z^n; u^{m+1}, \ldots, u^n) \equiv \sum_{i_1=0}^{N_1} \cdots \sum_{i_n=0}^{N_m} c_{i_1 \ldots i_n}^n z_{i_1 \ldots i_n}^n +$ $\sum_{k=m+1}^{n} \sum_{i_k=0}^{N_k} u_{i_k}^k \left[ \sum_{i_1=0}^{N_1} \cdots \sum_{i_{k-1}=0}^{N_{k-1}} \sum_{i_{k+1}=0}^{N_{k+1}} \cdots \right.$ $\left. \sum_{i_n=0}^{N_m} z_{i_1 \ldots i_n}^n - 1 \right] \equiv$ $\sum_{i_1=0}^{N_1} \cdots \sum_{i_n=0}^{N_m} \left[ c_{i_1 \ldots i_n}^n + \sum_{k=m+1}^{n} u_{i_k}^k \right] z_{i_1 \ldots i_n}^n -$ $\sum_{k=m+1}^{n} \sum_{i_k=0}^{N_k} u_{i_k}^k$ Subject to: $\sum_{i_2=0}^{N_2} \cdots \sum_{i_n=0}^{N_m} z_{i_1 \ldots i_n}^n = 1, i_1 = 1, \ldots, N_1,$ $\sum_{i_1=0}^{N_1} \cdots \sum_{i_{k-1}=0}^{N_{k-1}} \sum_{i_{k+1}=0}^{N_{k+1}} \cdots \sum_{i_n=0}^{N_m} z_{i_1 \ldots i_n}^n = 1,$ for $i_k = 1, \ldots, N_k$ and $k = 2, \ldots, m,$ $z_{i_1 \ldots i_n}^n \in \{0, 1\}$ for all $i_1, \ldots, i_n.$ wherein we have added the multiplier $u_0^k = 0$ for notational convenience Thus the multiplier $u^k \in \mathbf{R}^{N_k+1}$ with $u_0^k = 0$ is fixed.

An optimal (or suboptimal) solution of [6.2] can be constructed from that of an m-dimensional assignment problem. To show this, define for each $(i_1, \ldots, i_m)$ an index $(j_{m+1}, \ldots, j_n) = (j_{m+1}(i_1, \ldots, i_m), \ldots, j_n(i_1, \ldots, i_m))$ and a new cost function $c_{i_1 \ldots i_m}^m$ by $(j_{m+1}, \ldots, j_n) =$  [6.3]

$\arg\min \left\{ c_{i_1 \ldots i_n}^n + \sum_{k=m+1}^{n} u_{i_k}^k | i_k = 0, \ldots, N_k \text{ and} \right.$ $\left. k = m+1, \ldots, n \right\}$ $c_{i_1 \ldots i_m}^m = c_{i_1 \ldots i_m j_{m+1} \ldots j_n}^n + \sum_{k=m+1}^{n} u_{j_k}^k$ for $(i_1, \ldots, i_m) \neq (0, \ldots, 0)$ $c_{0 \ldots 0}^m = \sum_{i_{m+1}=0}^{N_{m+1}} \cdots \sum_{i_n=0}^{N_m}$ Minimize $\left\{ 0, c_{0 \ldots 0 i_{m+1} \ldots i_n}^n + \sum_{k=m+1}^{n} u_{i_k}^k \right\}$ (If $(j_{m+1}, \ldots, j_n)$ is not unique, choose the smallest such $j_{m+1}$, amongst those (n–m)-tuples with the same $j_{m+1}$ choose the smallest $j_{m+2}$, etc., so that $(j_{m+1}, \ldots j_n)$ is uniquely defined.) Using the cost coefficients defined in this way, the following m-dimensional assignment problem is obtained:

$\hat{\Phi}_{mn}(u^{m+1}, \ldots, u^n) =$  [6.4]

Minimize $\hat{\phi}_{mn}(z^m; u^{m+1}, \ldots, u^n) \equiv$ $v_m(z^m) \equiv \sum_{i_1=0}^{N_1} \cdots \sum_{i_m=0}^{N_m} c_{i_1 \ldots i_m}^m z_{i_1 \ldots i_m}^m$ Subject to: $\sum_{i_2=0}^{N_2} \cdots \sum_{i_m=0}^{N_m} z_{i_1 \ldots i_m}^m = 1, i_1 = 1, \ldots, N_1,$ $$\sum_{i_1=0}^{N_1} \cdots \sum_{i_{k-1}=0}^{N_{k-1}} \sum_{i_{k+1}=0}^{N_{k+1}} \cdots \sum_{i_m=0}^{N_m} z^m_{i_1 \ldots i_m} = 1,$$

for $i_k = 1, \ldots, N_k$ and $k = 2, \ldots, m-1$, $$\sum_{i_1=0}^{N_1} \cdots \sum_{i_{m-1}=0}^{N_{m-1}} z^m_{i_1 \ldots i_m} = 1, i_m = 1, \ldots, N_m$$

$$z^m_{i_1 \ldots i_m} \in \{0, 1\} \text{ for all } i_1, \ldots, i_m.$$

As an aside, observe that any feasible solution $z^n$ of [6.1] yields a feasible solution $z^m$ of [6.4] via the construction $$z^m_{i_1 \ldots i_m} = \begin{cases} 1 & \text{if } z^n_{i_1 \ldots i_{m-1} i_n} = 1 \text{ for some } (i_{m+1}, \ldots, i_n) \\ 0 & \text{otherwise.} \end{cases}$$

Thus, the m-dimensional assignment problem [6.4] has at least as many feasible solutions of the constraints as the original problem [6.1].

The following Fact A.2 has been shown to be true. It states that an optimal solution of Problem Formulation [6.2] can be computed from that of Problem Formulation [6.4]. Furthermore, the converse to this fact is provided in Fact A.3. Moreover, if the solution of either of these two problems [6.2] or [6.4] is $\epsilon$-optimal (i.e., the objective function associated with the suboptimal solution is within "$\epsilon$" of the objective function associated with the optimal solution), then so is the other.

Fact A.2. Let $w^m$ be a feasible solution to problem [6.4] and define $w^n$ by $$w^n_{i_1 \ldots i_n} = w^m_{i_1 \ldots i_m} \text{ if } (i_{m+1}, \ldots i_n) = (j_{m+1}, \ldots j_n) \text{ and} \quad [6.5]$$

$(i_1, \ldots i_m) \neq (0, \ldots, 0)$ $w^n_{i_1 \ldots i_n} = 0$ if $(i_{m+1}, \ldots i_n) \neq (j_{m+1}, \ldots j_n)$ and $(i_1, \ldots i_m) \neq (0, \ldots, 0)$ $w^n_{0 \ldots 0 i_{m+1} \ldots i_n} = 1$ if $c^n_{0 \ldots 0 i_{m+1} \ldots i_n} + \sum_{k=m+1}^{n} u^k_{i_k} \leq 0$ $w^n_{0 \ldots 0 i_{m+1} \ldots i_n} = 0$ if $c^n_{0 \ldots 0 i_{m+1} \ldots i_n} + \sum_{k=m+1}^{n} u^k_{i_k} > 0$ Then $w^n$ is a feasible solution of the Lagrangian relaxed problem [6.2] and $$\phi_{mn}(w^n; u^{m+1}, \ldots, u^n) = \hat{\phi}_{mn}(w^m; u^{m+1}, \ldots, u^n) - \sum_{k=m+1}^{n} \sum_{i_k=0}^{M_k} u^k_{i_k}.$$

If, in addition, $w^m$ is optimal for [6.4], then $w^n$ is an optimal solution of [6.2] and $$\Phi_{mn}(u^{m+1}, \ldots, u^n) = \hat{\Phi}_{mn}(u^{m+1}, \ldots, u^n) - \sum_{k=m+1}^{n} \sum_{i_k=0}^{M_k} u^k_{i_k}.$$

With the exception of one equality being converted to an inequality, the following Fact is a converse of Fact A.2 and has also been shown to be true.

Fact A.3. Let $w^n$ be a feasible solution to problem [6.2] and define $w^m$ by $$w^m_{i_1 \ldots i_m} = \sum_{i_{m+1}=0}^{N_{m+1}} \cdots \sum_{i_n=0}^{N_m} w^n_{i_1 \ldots i_n} \quad [6.6]$$

for $(i_1, \ldots, i_m) \neq (0, \ldots, 0)$ $w^m_{0 \ldots 0} = 0$ if $(i_1, \ldots, i_m) = (0, \ldots, 0)$ and $c^n_{0 \ldots 0 i_{m+1} \ldots i_n} + \sum_{k=m+1}^{n} u^k_{i_k} > 0$ for all $(i_{m+1}, \ldots, i_n)$ $w^m_{0 \ldots 0} = 1$ if $(i_1, \ldots, i_m) = (0, \ldots, 0)$ and $c^n_{0 \ldots 0 i_{m+1} \ldots i_n} + \sum_{k=m+1}^{n} u^k_{i_k} \leq 0$ for some $(i_{m+1}, \ldots, i_n)$.

Then $w^m$ is a feasible solution of the problem [6.4] and $$\phi_{mn}(w^n; u^{m+1}, \ldots, u^n) \geq \hat{\phi}_{mn}(w^m; u^{m+1}, \ldots, u^n) - \sum_{k=m+1}^{n} \sum_{i_k=0}^{M_k} u^k_{i_k}.$$

If, in addition, $w^n$ is optimal for [6.2], then $w^m$ is an optimal solution of [6.4], $$\phi_{mn}(w^n; u^{m+1}, \ldots, u^n) = \hat{\phi}_{mn}(w^m; u^{m+1}, \ldots, u^n) - \sum_{k=m+1}^{n} \sum_{i_k=0}^{M_k} u^k_{i_k},$$

and $$\Phi_{mn}(u^{m+1}, \ldots, u^n) = \hat{\Phi}_{mn}(u^{m+1}, \ldots, u^n) - \sum_{k=m+1}^{n} \sum_{i_k=0}^{M_k} u^k_{i_k}.$$

II.2.2. The Recovery Procedure

The next objective is to explain a recovery procedure or method for recovering a solution to the n-dimensional problem of [6.1] from a relaxed problem having potentially substantially fewer dimensions than [6.1]. Note that this aspect of the alternative embodiment of the present invention is substantially different from the method disclosed in the first embodiment of the multi-dimensional assignment solving process of section I.1 of this specification. Further, this alternative embodiment provides substantial benefits in terms of computational efficiency and accuracy over the first embodiment, as will be discussed. Thus, given a feasible (optimal or suboptimal) solution $w^m$ of [6.4] (or $w^n$ if Problem Formulation [6.2] is constructed via Fact A.2), an explanation is provided here regarding how to generate a feasible solution $z^n$ of [6.1] which is close to $w^m$ in a sense to be specified. We first assume that no variables in [6.1] are preassigned to zero (this assumption will be removed shortly). The difficulty with the solution $w^n$ is that it need not satisfy the last n-m sets of constraints in [6.1]. Note, however, that if $w^m$ is an optimal solution for [6.4] and $w^n$ (constructed as in Fact A.2) satisfies the relaxed constraints, then $w^n$ is optimal for [6.1]. The recovery procedure described here is designed to preserve the 0–1 character of the solution $w^m$ of [6.4] as far as possible. That is, if $w_{i_1 \ldots i_m}^m = 1$ and $i_l \neq 0$ for at least one $l = 1, \ldots, m$, then the corresponding feasible solution $z^n$ of [6.1] is constructed so that $z_{i_1 \ldots i_n}^n = 1$ for some $(i_{m+1}, \ldots, i_n)$. Note that by this reasoning, variables of the form $z_{0 \ldots 0 i_{m+1} \ldots i_n}^n$ can be assigned to a value of 1 in the recovery problem only if $w_{0 \ldots 0}^m = 1$. However, variables $z_{0 \ldots 0 i_{m+1} \ldots i_n}^n$ will be treated differently in the recovery procedure in that they can be assigned 0 or 1 independent of the value $w_{0 \ldots 0}^m$. This increases the feasible set of the recovery problem, leading to a potentially better solution.

Let $\{(i_1^j, \ldots, i_m^j)\}_{j=1}^{N_0}$ be an enumeration of indices of $w^m$ (or the first m indices of $w^n$ constructed as in Fact A.2) such that $$w^m_{i_1^j \ldots i_m^j} = 1$$

and $(i_1^j, \ldots, i_m^j) \neq (0, \ldots, 0)$. Set $(i_1^0, \ldots, i_m^0) = (0, \ldots, 0)$ for j=0 and define $$c_{ji_{m+1}\ldots i_n}^{n-m+1} = c_{i_1^j i_m i_{m+1} \ldots i_n}^{n} \quad [6.7]$$

for $i_k = 0, \ldots, N_k$;

$k = m+1, \ldots, n; j = 0, \ldots, N_0.$

Let Y denote the solution of the (n–m+1)-dimensional assignment problem:

$$\text{Minimize} \sum_{j=0}^{N_0} \sum_{i_{m+1}=0}^{N_{m+1}} \cdots \sum_{i_n=0}^{N_m} c_{ji_{m+1}\ldots i_n}^{n-m+1} y_{ji_{m+1}\ldots i_n} \quad [6.8]$$

$$\text{Subject to} \sum_{i_{m+1}=0}^{N_{m+1}} \cdots \sum_{i_n=0}^{N_m} y_{ji_{m+1}\ldots i_n} = 1, j = 1, \ldots, N_0,$$

$$\sum_{j=0}^{N_0} \sum_{i_{m+1}=0}^{N_{m+1}} \cdots \sum_{i_{k-1}=0}^{N_{k-1}} \sum_{i_{k+1}=0}^{N_{k+1}} \cdots \sum_{i_n=0}^{N_m} y_{ji_{m+1}\ldots i_n} = 1,$$

for $i_k = 1, \ldots, N_k$ and $k = m+1, \ldots, n-1$, $$\sum_{j=0}^{N_0} \sum_{i_{m+1}=0}^{N_{m+1}} \cdots \sum_{i_{n-1}=0}^{N_{m-1}} y_{ji_{m+1}\ldots i_n} = 1, i_n = 1, \ldots, N_m,$$

$y_{ji_{m+1}\ldots i_n} \in \{0, 1\}$ for all $j, i_{m+1}, \ldots, i_n$.

The recovered feasible solution $z^n$ of [6.1] corresponding to the multiplier set $\{u^m, \ldots, u^n\}$ is then defined by $$z_{i_1\ldots i_n}^{n} = \begin{cases} 1 & \text{if } (i_1, \ldots, i_m) = (i_1^j, \ldots, i_m^j) \text{ for some} \\ & j = 0, \ldots, N_0 \text{ and } Y_{ji_{m+1}\ldots i_n} = 1 \\ 0 & \text{otherwise.} \end{cases} \quad [6.9]$$

This recovery procedure is valid as long as all cost coefficients $c^n$ are defined and all zero-one variables in $z^n$ are free to be assigned. Note that modifications are necessary for sparse problems. If the cost coefficient $$c_{i_1^j\ldots i_m i_{m+1}\ldots i_n}^{nj}$$

is well defined and the zero-one variable $$z_{i_1^j\ldots i_m i_{m+1}\ldots i_n}^{nj}$$

is free to be assigned to zero or one, then define $$c_{ji_{m+1}\ldots i_n}^{n-m+1} = c_{i_1^j\ldots i_m i_{m+1}\ldots i_n}^{nj}$$

as in [6.7] with $z_{ji_{m+1}\ldots i_n}^{n-m+1}$ being free to be assigned. Otherwise, $z_{ji_{m+1}\ldots i_n}^{n-m+1}$ is preassigned to zero. To ensure that a feasible solution exists, we now only need ensure that the variables $z_{j0\ldots 0}^{n-m-1}$ are free for $j=0, 1, \ldots, N_0$. (Recall that all variables of the form $z_{0\ldots i_k\ldots 0}^{n}$ are free (to be assigned) and all coefficients of the form $c_{0\ldots i_k\ldots 0}^{n}$ are well defined for $k=1, \ldots, n$.) This is accomplished as follows. If the cost coefficient $$c_{i_1^j i_2^j\ldots i_m^j 0\ldots 0}^{nj}$$

is well defined and $$z_{i_1^j i_2^j\ldots i_m^j 0\ldots 0}^{nj}$$

is free, then define $$c_{j0\ldots 0}^{n-m+1} = c_{i_1^j i_2^j\ldots i_m^j 0\ldots 0}^{nj}$$

with $z_{j0\ldots 0}^{n-m+1}$ being free. Otherwise since all variables of the form $z_{0\ldots i_k\ldots 0}^{n}$ are known feasible and have well-defined costs, put $$c_{j0\ldots 0}^{n-m+1} = \sum_{k=1, i_k^j \neq 0}^{m} c_{0\ldots 0 i_k^j 0\ldots 0}^{n}.$$

II.3. The Multi-Dimensional Lagrangian Relaxation Algorithm for the n-Dimensional Assignment Problem Starting with the M-dimensional assignment problem [6.1], i.e., n=M, the algorithm described below is recursive in that the M-dimensional assignment problem is relaxed to an m-dimensional problem by incorporating (n–m) sets of constrains into the objective function using Lagrangian relaxation of this set. This problem is maximized with respect to the Lagrange multipliers, and a good suboptimal solution to the original problem is recovered using an (n–m+1)-dimensional assignment problem. Each of these two (the m-dimensional and the (n–m+1)-dimensional assignment problems) can be solved in a similar manner.

Figure 8:
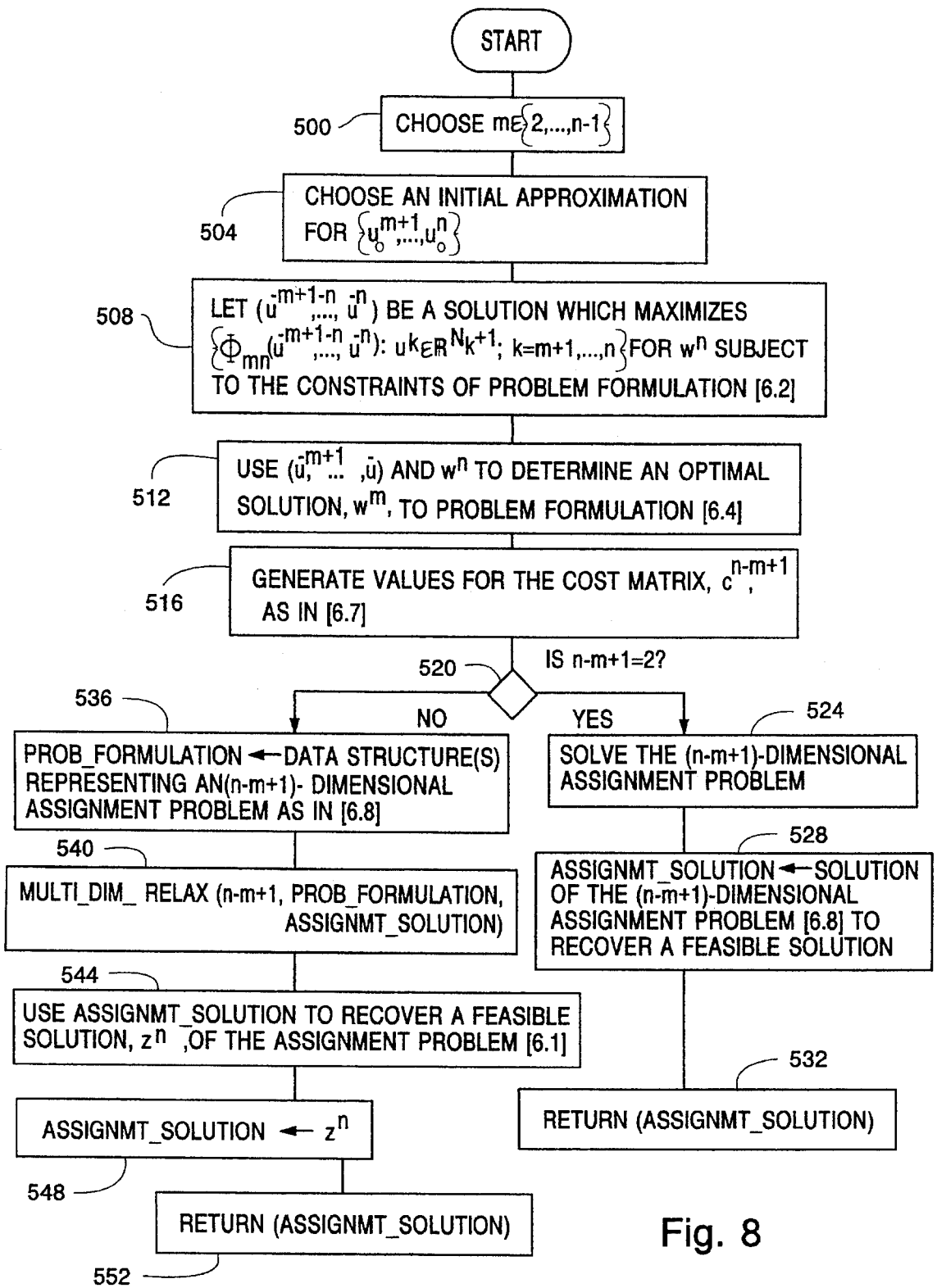
FIG. 8 is a flowchart describing the procedure for solving a n-dimensional assignment problem according to the second embodiment of the invention.

More precisely, reference is made to FIG. 8 which presents a flowchart of a procedure embodying the multi-dimensional relaxation algorithm, referred to immediately above. This procedure, denoted MULTI_DIM_RELAX in FIG. 8, has three formal parameters, n, PROB_FORMULATION and ASSIGNMENT_SOLUTION, which are used to transfer information between recursive instantiations of the procedure. In particular, the parameter, n, is an input parameter supplying the dimension for the multi-dimensional assignment problem (as in [6.1]) which is to be solved (i.e., to obtain an optimal or near-optimal solution). The parameter, PROB_FORMULATION, is also an input parameter supplying the data structure(s) used to represent the n-dimensional assignment problem to be solved. Note that PROB_FORMULATION at least provides access to the cost matrix, $[c^n]$, and the observation sets whose observations are to be assigned. Additionally, the parameter, ASSIGNMENT_SOLUTION, is used as an output parameter for returning a solution of a lower dimensioned assignment problem to an instantiation of MULTI_DIM_RELAX which is processing a higher dimensioned assignment problem.

A description of FIG. 8 follows. Assuming MULTI_DIM_RELAX is initially invoked with M as the value for the parameter n and the PROB_FORMULATION having a data structure(s) representing an M-dimensional assignment problem as in [5.5], in step 500 an integer m, $2 \leq m < n$ is chosen such that the constraint sets or dimensions $m+1, \ldots, n$ are to be relaxed so that an m-dimensional problem formulation as in [6.2] results. In step 504 an initial approximation is provided for $\{u_0^{m+1}, \ldots u_0^n\}$. Subsequently, in step 508 the above initial values for $\{u_0^{m+1}, \ldots, u_0^n\}$ are used in an iterative process in determining $(\bar{u}^{m+1}, \ldots, \bar{u}^n)$ which maximizes $\{\Phi_{mn}(u^{m+1}, \ldots, u^n)$ where $u^k \in \mathbb{R}^{M_k+1}$ and $k=m+1, \ldots, n\}$ for a feasible solution $w^n$ subject to the constraints of Problem Formulation [6.2]. Note that by maximizing $\Phi_{mn}(u^{m+1}, \ldots, u^n)$, some of the constraints that were relaxed are being forced to be satisfied and in so doing information is built into a solution of this function for solving the input assignment problem in "PROB_FORMULATION." Further note that a non-smooth optimization technique is used here and that a preferred method of determining a maximum in step 508 is the bundle-trust method of Schramm and Zowe as described in H. Schramm and J. Zowe, *A version of the bundle idea for minimizing a non-smooth function: Conceptual idea, convergence analysis, numerical results*, SIAM Journal on Optimization, 2 (1992), pp. 121–152. This method, along with various other methods for determining the maximum in step 508, are discussed below.

Also note that for m>2, a solution to the optimization problem of step 508 is NP-hard and therefore cannot be solved optimally. That is, there is no known computationally tractable method for guarantying an optimal solution. Thus, there are two possibilities: either (a) allow m to be greater than 2 and use auxiliary functions similar to those disclosed in the first embodiment of the k-dimensional assignment solver 300 in section I to compute a near-optimal solution, or (b) make m=2 wherein algorithms such as the forward/reverse auction algorithm of D. P. Bertsekas and D. A. Castañon in their paper, *A forward/reverse auction algorithm for asymmetric assignment problems*, Computational Optimization and Applications, 1 (1992), pp. 277–298, provides an optimal solution.

If option (a) immediately above is chosen, then the auxiliary functions are used as approximation functions for obtaining at least a near-optimal solution to the optimization problem of step 508. Note that the auxiliary functions used depend on the value of m. Thus, auxiliary functions used when m=3 will likely be different from those for m=4. But in any case, the optimization procedure is guided by using the merit function, $\Phi_{2n}(u^3, \ldots, u^n)$, which can be computed exactly via a 2-dimensional assignment problem for guiding the maximization process.

Alternatively, if option (b) above is chosen, then two important advantages result: the optimization problem of step 508 can be always solved optimally and without using auxiliary approximation functions. Thus, better solutions to the original M-dimensional assignment problem are likely since there is no guarantee that when the non-smooth optimization techniques are applied to the auxiliary functions the techniques will yield an optimal solution to step 508. Furthermore, it is important to note that without auxiliary functions, the processing in step 508 is both conceptually easier to follow and more efficient.

Subsequently, in step 512 of FIG. 8, the solution $(\bar{u}^{m+1}, \ldots, \bar{u}^n)$ and $w^n$ is used in determining an optimal solution $w^m$ to Problem Formulation [6.4] as generated according to [6.3] and Fact A.3.

In step 516, the solution $w^n$ is used in defining the cost matrix $c^{n-m+1}$ as in [6.7]. Subsequently, if n−m+1=2, then the assignment problem [6.8] may be solved straightforwardly using known techniques such as forward/reverse auction algorithms. Following this, in step 528, the solution to the 2-dimensional assignment problem is assigned to the variable ASSIGNMENT_SOLUTION and in step 532 ASSIGNMENT_SOLUTION is returned to a dimension three level recursion of MULTI_DIM_RELAX for solving a 3-dimensional assignment problem.

Alternatively, if in step 520, n−m+1>2, then in step 536 the data structure(s) representing a problem formulation as in [6.8] is generated and assigned to the parameter, PROB_FORMULATION. Subsequently, in step 540 a recursive copy of MULTI_DIM_RELAX is invoked to solve the lower dimensional assignment problem represented by PROB_FORMULATION. Upon the completion of step 540, the parameter, ASSIGNMENT_SOLUTION, contains the solution to the n−m+1 dimensional assignment problem. Thus, in step 544, the n−m+1 solution is used to solve the n-dimensional assignment problem as discussed regarding equations [6.9]. Finally, in steps 548 and 552 the solution to the n-dimensional assignment problem is returned to the calling program so that, for example, it may be used in taking one or more actions such as (a) sending a warning to aircraft or sea facility; (b) controlling air traffic; (c) controlling anti-aircraft or anti-missile equipment; (d) taking evasive action; or (e) surveilling an object.

II.3.1. Comments on the Various Procedures Provided by FIG. 8

There are many procedures described by FIG. 8. One such procedure is the first embodiment of the multi-dimensional assignment solving process of section I.1. That is, by specifying m=n−1 in step 500, a single set of constraints is relaxed in step 508. Thus, one set of constraints incorporated is into the objective function via the Lagrangian problem formulation,resulting in an m=n−1 dimensional problem. The relaxed problem is subsequently maximized in step 512 with respect to the corresponding Lagrange multipliers and then a feasible solution is reconstructed for the n-dimensional problem using a two-dimensional assignment problem. The second procedure provided by FIG. 8 is a novel approach which is not suggested by the first embodiment of section I.1. In fact, the second procedure is somewhat of a mirror image of the first embodiment in that n−2 sets of constraints are simultaneously relaxed, yielding immediately an m=2 dimensional problem in step 512. Thus, a feasible solution to the n-dimensional problem is then recovered using a recursively obtained solution to an n−1 dimensional problem via step 540. In this case, the function values and subgradients of $\Phi_{2n}(u^3, \ldots, u^n)$ of step 508 can be computed optimally via a two dimensional assignment problem. The significant advantage here is that there is no need for the merit or auxiliary functions, $\Psi_k$, as required in the first embodiment of the multi-dimensional assignment solving process of section I.1 above and also there is no need for the more general merit or auxiliary functions $\Psi_{mn}$, as discussed in subsection II.4.2 below. Further, note that all function values and subgradients used in the non-smooth maximization process are computed exactly (i.e., optimally) in this second procedure. Moreover, problem decomposition is now carried out for the n-dimensional problem; however, decomposition of the n−1 dimensional recovery problem (and all lower recovery problems) is performed only after the problem is formulated.

Between these two procedures are a host of different relaxation schemes based on relaxing n−m sets of constraints to an m-dimensional problem (2<m<n), but these all have the same difficulties as the procedure for the first embodiment of section I.1 in that the relaxed problem is an NP-hard problem. To resolve this difficulty, we use an auxiliary or merit function $\Psi_{mn}$ as described in subsection II.4.2 below. (The notation $\Psi_k$ was used for $\Psi_{n-1,n}$ in section I.1.) For the case m<n−1, the recovery procedure is still based on an NP-hard n−m+1 dimensional assignment problem. Note that the partitioning techniques similar to those discussed in Section I.3 may be used to identify the assignment problem with a layered graph and then to find the disjoint components of this graph. In general, all relaxed problems can be decomposed prior to any non-smooth computations because their structure stays fixed throughout the algorithm of FIG. 8. However, all recovery problems cannot be decomposed until they are formulated, as their structure changes as the solutions to the relaxed problems change.

II.4. Details and Refinements Relating to the Flowchart of FIG. 8

Further explanation is provided here on how various steps of FIG. 8 are solved. Note that the refinements presented here can significantly increase the speed of the relaxation procedure of step 508.

II.4.1 Maximization of the Non-smooth Function $\Phi_{mn}(u^{m+1}, \ldots, u^n)$ One of the key steps in the Lagrangian relaxation algorithm in section II.3 is the solution of the problem $$\text{Maximize } \{\Phi_{mn}(u^{m+1}, \ldots, u^n) : u^k \in \mathbb{R}^{M_k+1}; k=m+1, \ldots, n\} \quad [7.1]$$

where $u_0^k = 0$ for all $k = m+1, \ldots, n$. The evaluation of $\Phi_{mn}(u^{m+1}, \ldots, u^n)$ requires the optimal solution of the corresponding minimization problem [6.2] $Z^n$ varies for each instance of $(u^{m+1}, \ldots, u^n)$. The following discussion provides some properties of these functions.

Fact A.4 Let $u^{m+1}, \ldots, u^n$ be multiplier vectors associated with the $(m+1)^{st}$ through the $n^{th}$ set of constraints [6.1], let $\Phi_{mn}$ be as defined in [6.2], let $V_n(\bar{z}^n)$ be the objective function value of the n-dimensional assignment problem in equation [6.1], let $z^n$ be any feasible solution of [6.1], and let $\bar{z}^n$ be an optimal solution of [6.1]. Then, $\Phi_{mn}(u^{m+1}, \ldots, u^n)$ is piecewise affine concave and continuous in $\{u^{m+1}, \ldots, u^n\}$ and $$\Phi_{mn}(u^{m+1}, \ldots, u^n) \leq V_n(\bar{z}^n) \leq V_n(z^n) \quad [7.2a]$$

Furthermore, $$\Phi_{m-1n}(u^m, u^{m+1}, \ldots, u^n) \leq \Phi_{mn}(u^{m+1}, \ldots, u^n) \quad [7.2a]$$

for all $u^k \in \mathbb{R}^{M_k+1}$ with $u_0^k = 0$ and $k = m, \ldots, n$.

Most of the procedures for non-smooth optimization are based on generalized gradients called subgradients, given by the following definition.

Definition. At $u = (u^{m+1}, \ldots, u^n)$ the set $\delta\Phi_{mn}(u)$ is called a subdifferential of $\Phi_{mn}$ and is defined by $$\delta\Phi_{mn}(u) = \{q \in \mathbb{R}^{M_{m+1}+1} x \ldots x \mathbb{R}^{M_n+1} | \Phi_{mn}(w) - \Phi_{mn}(u) \leq q^T(w-u) \forall w \in \mathbb{R}^{M_{m+1}+1} x \ldots x \mathbb{R}^{M_n M_{n+1}}\} \quad [7.3]$$

A vector $q \in \delta\Phi_{mn}(u)$ is called a subgradient.

If $z^n$ is an optimal solution of [6.2] computed during evaluation of $\Phi_{mn}(u)$ differentiating $\Phi_{mn}$ with respect to $u_{i_n}^n$ yields the following $i_n$-th component of a subgradient g of $\Phi_{mn}(u)$ $$g_0^k = 0 \quad [7.4]$$

$$g_{i_k}^k = \sum_{i_1=0}^{N_1} \ldots \sum_{i_{k-1}=0}^{N_{k-1}} \sum_{i_{k+1}=0}^{N_{k+1}} \ldots \sum_{i_n=0}^{N_m} z_{i_1 \ldots i_n}^n - 1$$

for $i_k = 1, \ldots, N_k$ and $k = m+1, \ldots, n$.

If $z^n$ is the unique optimal solution of [6.2], $\delta\Phi_{mn}(u) = \{g\}$, and $\Phi_{mn}$ is differentiable at u. If the optimal solution is not unique, then there are finitely many such solutions, say $z^n(1), \ldots, z^n(K)$. Given the corresponding subgradients, $g^1, \ldots, g^K$, the subdifferential $\delta\Phi(u)$ ms the convex hull of $\{g^1, \ldots, g^K\}$.

II.4.2 Mathematical Description of a Merit or Auxiliary Function

For real-time needs, one must address the fact that the non-smooth optimization problem of step 508 (FIG. 8) requires the solution of an NP-hard problem for $m > 2$. One approach to this problem is to use the following merit or auxiliary function to decide whether a function value has increased or decreased sufficiently in the line search or trust region methods:

$$\Psi_{mn}(\bar{u}^3, \ldots, \bar{u}^m; u^{m+1}, \ldots, u^n) = \quad [7.5]$$

$$\begin{cases} \Phi_{mn}(u^{m+1}, \ldots, u^n) & \text{if } m=2 \\ & \text{or (6.2) is solved optimally,} \\ \Phi_{2n}(\bar{u}^3, \ldots, \bar{u}^m; u^{m+1}, \ldots, u^n) & \text{otherwise.} \end{cases}$$

where the multipliers $\bar{u}^3, \ldots, \bar{u}^m$ that appear in lower order relaxations used to construct (suboptimal) solutions of the m-dimensional relaxed problem (6.2) have been explicitly included. Note that $\Psi_{mn}$ is well-defined since (6.4) can always be solved optimally if $m=2$. For sufficiently small problems (6.2) or (6.4), one can more efficiently solve the NP-hard problem by branch and bound. This is the reason for the inclusion of the first case; otherwise, the relaxed function $\Phi_{2n}$ is used to guide the non-smooth optimization phase. That the merit function provides a lower bound for the optimal solution follows directly from Fact A.4 and the following fact.

Fact A.5. Given the definition of $\Psi_{mn}$ in (7.5) above $\Psi_{mn}(\bar{u}^3, \ldots, \bar{u}^m; u^{m+1}, \ldots, u^n) \leq \Phi_{mn}(u^{m+1}, \ldots, u^n)$ for all multipliers $$\bar{u}^3, \ldots, \bar{u}^m, u^{m+1}, \ldots, u^n. \quad [7.6]$$

The actual function value used in the optimization phase is $\Psi_{mn}$; however, the subgradients are computed as in (7.4), but with the solution $z_{i_1 \ldots i_n}^n$ being a suboptimal solution constructed from a relaxation procedure applied to the m-dimensional problem. Again, the use of these lower order relaxed problems is the reason for the inclusion of the multipliers $\bar{u}^3, \ldots, \bar{u}^m$.

To explain how the merit function is used, suppose there is a current multiplier set $(u_{old}^{m+1}, \ldots, u_{old}^n)$ and it is desirable to update to a new multiplier set $(u_{new}^{m+1}, \ldots, u_{new}^n)$ via $(u_{new}^{m+1}, \ldots, u_{new}^n) = (u_{old}^{m+1}, \ldots, u_{old}^n) + (\Delta u^{m+1}, \ldots, \Delta u^n)$. Then $\Psi_{mn}(\bar{u}_{old}^3, \ldots, \bar{u}_{old}^m; u_{old}^{m+1}, \ldots, u_{old}^n)$ is computed where $(\bar{u}_{old}^3, \ldots, \bar{u}_{old}^m)$ is obtained during the relaxation process used to compute a high quality solution to the relaxed m-dimensional assignment problem (6.2) at $(u^{m+1}, \ldots, u_{new}^n) = (u_{old}^{m+1}, \ldots, u_{old}^n)$. The decision to accept $(u_{new}^{m+1}, \ldots, u_{new}^n)$ is then based on $\Psi_{mn}(\bar{u}_{old}^3, \ldots, \bar{u}_{old}^m; u_{old}^{m+1}, \ldots, u_{old}^n) < \Psi_{mn}(\bar{u}_{new}^3, \ldots, \bar{u}_{new}^m; u_{new}^{m+1}, \ldots, u_{new}^n)$ or some other stopping criteria commonly used in line searches. Again, $(\bar{u}_{new}^3, \ldots, \bar{u}_{new}^m)$ represents the multiplier set used in the lower level relaxation procedure to construct a high quality feasible solution to the m-dimensional relaxed problem (6.2) at $(u^{m+1}, \ldots, u^n) = (u_{new}^{m+1}, \ldots, u_{new}^n)$. The point is that each time one changes $(u^{m+1}, \ldots, u^n)$ and uses the merit function $\Psi_{mn}(\bar{u}^3, \ldots, \bar{u}^m; u^{m+1}, \ldots, u^n)$ for comparison purposes, one must generally change the lower level multipliers $(\bar{u}^3, \ldots, \bar{u}^m)$.

An illustration of this merit function for $m = n-1$ is given in "PARTITIONING MULTIPLE DATA SETS, MULTIDIMENSIONAL ASSIGNMENTS AND LAGRANGIAN RELAXATION", by Aubrey B. Poore and Nenad Rij avec, and in "QUADRATIC ASSIGNMENT AND RELATED PROBLEMS, DIMACS SERIES IN DISCRETE MATHEMATICS AND THEORETICAL COMPUTER SCIENCE", in American Mathematical Society, Providence, R.I., Vol. 16, 1994, pp. 25–37 edited by Panos M. Pardalos and Henry Wolkowicz.

II.4.3 Non-smooth Optimization Methods

By Fact A.4 the function $\Psi_{mn}(u)$ is a continuous, piecewise affine, and concave, so that the negative of $\Psi_{mn}(u)$ is convex. Thus the problem of maximizing $\Psi_{mn}(u)$ is one of non-smooth optimization. Since there is a large literature on such problems, only a brief discussion of the primary classes of methods for solving such problems is provided. A first class of methods, known as subgradient methods, are reviewed and analyzed in the book by N. Z. Shor, *Minimization Methods for Non-Differentiable Functions,* Springer-Verlag, New York, 1985. Despite their relative simplicity, subgradient methods have some drawbacks that make them inappropriate for the tracking problem. They do not guarantee a descent direction at each iteration, they lack a clear stopping criterion, and exhibit poor convergence (less than linear).

A more recent and sophisticated class of methods are the bundle methods; excellent developments are presented in the books of Hiriart-Urruty and Lemaréchal: J.-B. Hiriart-Urruty and C. Lemaréchal, *Convex Analysis and Minimization Algorithms I and II,* Springer-Verlag, Berlin, 1993; and the book of K. C. Kiwiel: *Methods of Descent for Non-Differentiable Optimization, Lecture Notes in Mathematics,* Vol. 1133, Springer-Verlag, Berlin, 1985. Bundle methods retain a set (or bundle) of previously computed subgradients to determine the best possible descent direction at the current iteration. Because of the non-smoothness of $\Phi_{mn}$, the resulting direction may not provide a "sufficient" decrease in $\Phi_{mn}$. In this case, bundle algorithms take a "null" step, wherein the bundle is enriched by a subgradient close to $u_k$. As a result, bundle methods are non-ascent methods which satisfy the relaxed descent condition $\Phi_{mn}(u_{k+1}) < \Phi_{mn}(u_k)$ if $u_{k+1} \neq u_k$. These methods have been shown to have good convergence properties. In particular, bundle method variants have been proven to converge in a finite number of steps for piecewise affine convex functionals in K. C. Kiwiel, *An Aggregate Subgradient Method for Non-smooth Convex Minimization,* Mathematical Programming 27, (1983) pp. 320–341, and H. Schramm and J. Zowe, *A version of the bundle idea for minimizing a non-smooth function: Conceptual idea, convergence analysis, numerical results,* SIAM Journal on Optimization, 2 (1992), pp. 121–152.

All of the above non-smooth optimization methods require the computation $\Phi_{mn}(u)$ and a $g \in \delta\Phi_{mn}(u)$. These in turn require the computation of the relaxed cost coefficients [6.3]. In both the first and second procedures discussed in section II.3.1, maximization of $\Phi_{2n}(u)$ must be repeatedly evaluated. In the most efficient implementations presently known of these two procedures, it was found that at least 95% of the computational effort of the entire procedure is spent in the evaluation of the relaxed cost coefficients [6.3] as part of computing $\Phi_{2n}(u)$. Thus, generally a method should be chosen that makes as efficient use of the subgradients and function values as is possible, even at the cost sophisticated manipulation of the subgradients. In evaluating three different bundle procedures: (a) the conjugate subgradient method of Wolfe used in section I.1 of the first embodiment of the present invention; (b) the aggregate subgradient method of Kiwiel (described in K. C. Kiwiel, *An Aggregate Subgradient Method for Non-smooth Convex Minimization,* Mathematical Programming 27, (1983) pp. 320–341); and (c) the bundle trust method of Schramm and Zowe (described in H. Schramm and J. Zowe, *A version of the bundle idea for minimizing a non-smooth function: Conceptual idea, convergence analysis, numerical results,* SIAM Journal on Optimization, 2 (1992), pp. 121–152), it was determined that for a fixed number of non-smooth iterations, say, ten, the bundle-trust method provides good quality solutions with the fewest number of function and subgradient evaluations of all the methods, and is therefore the preferred method.

II.4.4 The Two Dimensional Assignment Problem

The forward/reverse auction algorithm of Bertsekas and Castañon (as described in D. P. Bertsekas and D. A. Castañon, *A forward/reverse auction algorithm for asymmetric assignment problems,* Computational Optimization and Applications, 1 (1992), pp. 277–298) is used to solve the many relaxed two dimensional problems that occur in the course of execution.

II.4.5. Initial Multipliers and Hot Starts

The effective use of "hot starts" is fundamental for real-time applications. A good initial set of multipliers can significantly reduce the number of non-smooth iterations (and hence the number of $\Phi_{mn}$ evaluations) required for a high quality recovered solution. Further, there are several ways that multipliers can be reused. First, if a n-dimensional problem is relaxed to a m-dimensional problem, relaxation provides the multiplier set $\{u^{m+1}, u^{m+2}, \ldots, u^n\}$. These can be used as the initial multipliers for the n–m+1 dimensional recovery problem for n–m+1>2. This approach has also worked well to reduce the number of non-smooth iterations during recovery.

Further, for track maintenance, initial feasible solutions are generated as follows. When a new scan of information (a new observation set) arrives from a sensor, one can obtain an initial primal feasible solution by matching new reports to existing tracks via a two dimensional assignment problem. This is known as the track-while-scan (TWS) approach. Thus, an initial primal solution exists and then we use the above relaxation procedure is to make improvements to this TWS solution. Also for track maintenance, multipliers are available from a previously solved and closely related multi-dimensional assignment problems for all but the new observation set.

II.4.6. Local Search Methods

Given a feasible solution of the multi-dimensional assignment problem, one can consider local search procedures to improve this result, as described in C. H. Papadimitriou and K. Steiglitz, *Combinatorial Optimization: Algorithms and Complexity,* Prentice-Hall, Englewood Cliffs, N.J., 1982, and J. Pearl, *Heuristics: intelligent search strategies for computer problem solving,* Addison-Wesley, 1984. One method is the idea of k-interchanges. Since for sparse problems only those active arcs that participate in the solution are stored, it is difficult to efficiently identify eligible variable exchange sets with some data structures for solving the assignment problem. However, a local search that may be more promising is to use the two dimensional assignment solver in the following way. Given a feasible solution to the multi-dimensional assignment problem, the indices that correspond to active arcs in the solution are enumerated. Subsequently, one coordinate is freed to formulate a two dimensional assignment problem with one index corresponding to the enumeration and the other to the freed coordinate, and then solve a two dimensional assignment problem to improve the freed index position.

II.4.7. Problem Decomposition

The procedures described thus far are all based on relaxation. Due to the sparsity of assignment problems, however, frequently a decomposition of the problem into a collection of disjoint components can be done wherein each of the components can be solved independently. Due to the setup costs of Lagrangian relaxations a branch and bound procedure is generally more efficient for small components, say ten to twenty feasible 0–1 variables (i.e., $z_{i_1 \ldots i_n}$). Otherwise, the relaxation procedures described above are used. Perhaps the easiest way to view the decomposition method is to view the reports or measurements as a layered graph. A vertex is associated with each observation point, and an edge is allowed to connect two vertices only if the two observations belong to at least one feasible track of observations. Given this graph, the decomposition problem can then be posed as that of identifying the connected subcomponents of a graph which can be accomplished by constructing a spanning forest via a depth first search algorithm, as described in A. V. Aho, J. E. Hopcroft, and J. D. Ullman, *The Design and Analysis of Computer Algorithms*, Addison-Wesley Publishing Company, Reading, Mass., 1974. Additionally, decomposition of a different type might be based on the identification of bi- and tri-connected components of a graph and enumerating on the connections. Here is a technical explanation. Let $$Z = \{z_{i_1 i_2 \ldots i_n} | z_{i_1 i_2 \ldots i_n} \text{ is not presassigned to zero}\}$$

denote the set of assignable variables. Define an undirected graph G(N,A) where the set of nodes is $$N = \{z_{i_n}^n | n=1, \ldots, n; i_n=1, \ldots, N_m\}$$

and arcs, $$A = \{(z_{j_n}^n, z_{j_1}^1) | n \neq 1, j_n \neq 0, j_1 \neq 0 \text{ and there exists } z_{i_1 i_2 \ldots i_n} \in Z \text{ such that } j_n = i_n \text{ and } j_1 = i_1\}.$$

Note that the nodes corresponding to zero index have not been included in the above defined graph, since two variables that have only the zero index in common can be assigned independently. Connected components of the graph are then easily found by constructing a spanning forest via a depth first search. (A detailed algorithm can be found in the book by Aho, Hopcroft and Ullman cited above). Furthermore, this procedure is used at each level in the relaxation, i.e., is applied to each assignment problem [3.1] for n=3, . . ., M.

The original relaxation problem is decomposed first. All relaxed assignment problems can be decomposed a priori and all recovery problems can be decomposed only after they are formulated. Hence, in the n-to-(n−1) case, we have n−2 relaxed problems that can all be decomposed initially, and the recovery problems that are not decomposed (since they are all two dimensional). In the n-to-2 case, we have only one relaxed problem that can be decomposed initially. This case yields n−3 recovery problems; which can be decomposed only after they are formulated.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or use of the invention. It is intended that the appended claims be construed to include alternative embodiments of the invention to the extent permitted by the prior art.

What is claimed is:

1. A system for tracking objects comprising:

means for repeatedly scanning a region containing a set of at least one moving object;

means for generating M sequential images or data-sets of said region using an output from said means for repeatedly scanning, wherein a plurality of points in said images or data-sets provide positional information for said at least one object in said set;

means for providing at least one track in a collection of tracks, wherein said at least one track tracks said at least one object in said set;

means for defining first optimization problem having a computational complexity, M dimensions and a first objective function, wherein said first objective function is specified using a plurality of costs for extending said at least one track using said points;

means for reducing said computational complexity of said first optimization problem to a second optimization problem, wherein a said second optimization problem is m-dimensional, where $2 \leq m < M$;

means for solving said second optimization problem;

means for defining third optimization problem using a solution of said second optimization problem wherein said third optimization problem has M−m+1 dimensions;

means for solving said third optimization problem; and means for recovering an optimal or near-optimal solution to said first optimization problem using a solution to said third optimization problem.

2. An apparatus as claimed in claim 1, further including means for taking one or more of the following actions based on said optimal or near-optimal assignment of said plurality of points to said collection of tracks:

sending a warning to aircraft or a ground or sea facility, controlling air traffic, controlling anti-aircraft or anti-missile equipment, taking evasive action, working on one of said one or more objects, surveilling one of said one or more objects.

3. An apparatus as claimed in claim 1, wherein said means for repeatedly scanning includes detecting one of radar, sonar, microwave and infrared radiation from said at least one object in said set.

4. An apparatus as claimed in claim 1, wherein said means for providing includes means for updating said collection of tracks with points from at least one of said images or data-sets when said first optimization problem is solved.

5. An apparatus as claimed in claim 1, wherein said means for defining said first optimization problem includes means for assigning substantially all of said points to said collection of tracks.

6. An apparatus as claimed in claim 1, wherein said means for defining said first optimization problem includes means for specifying M constraint sets, wherein each constraint set includes one of constraints for a collection of said points from a different one of said images or data-sets, and a constraint for each track in said collection of tracks.

7. An apparatus as claimed in claim 6, wherein said means for specifying includes means for providing, for each of said points, a related constraint in said first optimization problem, wherein said related constraint determines a limit on a number of said tracks in said collection to which the point can be assigned.

8. An apparatus as claimed in claim 6, wherein said means for defining said third optimization problem includes means for using M−m+1 constraint sets of said M constraint sets as constraints for said third optimization problem.

9. An apparatus as claimed in claim 6, wherein said means for reducing includes means for using m constraint sets of said M constraint sets as constraints for said second optimization problem.

10. An apparatus as claimed in claim 9, wherein said means for defining said third optimization problem includes means for specifying a third objective function included in said third optimization problem, wherein an enumeration of track extensions through m of said images or data sets determined by a solution to said second optimization problem is used in determining cost factors of said third objective function.

11. An apparatus as claimed in claim 10, wherein said means for recovering includes means for using said enumeration and an optimal or near-optimal solution to said third optimization problem to recover said optimal or near-optimal solution to said third optimization problem.

12. An apparatus as claimed in claim 1, wherein said means for defining said first optimization problem includes means for extrapolating at least some of said tracks in said collection and means for determining at least some of said costs based on distances from said points to said track extrapolations.

13. An apparatus as claimed in claim 1, wherein said means for defining said first optimization problem includes means for specifying said first objective function as including a summation of said costs for assignments of said points to one or more tracks of said collection.

14. An apparatus as claimed in claim 1, wherein said means for defining said first optimization problem includes means for specifying said first objective function to receive input representing an assignment of said points to one or more tracks of said collection and to output a cost.

15. An apparatus as claimed in claim 1, wherein said means for reducing includes means for specifying said second optimization problem by:
  (a) permitting point from at least two of said images or data-sets to be assigned to more than one track of said collection when said collection includes a plurality of tracks, and
  (b) adding a penalty factor to said first objective function for each point assigned to more than one track of said collection.

16. An apparatus as claimed in claim 1, wherein said means for reducing includes Lagrangian Relaxation means for reducing said first optimization problem to said second optimization problem.

17. An apparatus as claimed in claim 1, wherein a solution to said second optimization problem determines an extreme value for a set of m-dimensional optimization problems.

18. An apparatus as claimed in claim 1, wherein m=2.

19. An apparatus as claimed in claim 1, wherein said second optimization problem is solved optimally when m=2, and said second optimization problem is solved for a near-optimal solution using at least one auxiliary function when m>2.

20. An apparatus as claimed in claim 19, wherein said second optimization problem includes a second objective function defined as follows:

Maximize $\{\Phi_{mM}(u^{m+1}, \ldots, u^M) : u^k \in \mathbb{R}^{M_k+1}; k=m+1, \ldots, M\}$.

21. An apparatus as claimed in claim 1, wherein no auxiliary function of a multiplier or penalty vector is used in determining a solution to said second optimization problem.

22. An apparatus as claimed in claim 1, wherein said means for solving said third optimization problem includes means for iteratively using said means for reducing and said means for solving said second optimization problem wherein said third optimization problem replaces said first optimization problem.

23. A method for tracking objects, comprising:
  repeatedly scanning a region containing a set consisting of one or more moving objects and generating M sequential images or data sets of said region, a plurality of points in said images or data sets providing positional information for objects in said set;
  determining a plurality of tracks, at least one track for each object in said set;
  determining a plurality of costs, wherein each cost is for assigning one of said points to one of said tracks;
  solving a first optimization problem for determining a first optimal or near-optimal assignment of said plurality of points to said tracks, said first optimization problem having:
    (A1) a first objective function defined using said plurality of costs, and
    (A2) an M-dimensional constraint set wherein constraints of said M-dimensional constraint sets determine a limit on a number of said tracks for assigning said points;
  said step of solving including performing steps (B1) through (B4):
    (B1) partitioning said M-dimensional constraint set into a plurality of lower dimensional constraint sets, said plurality of lower dimensional constraint sets, including a second constraint set and a third constraint set, wherein said second constraint set has m dimensions and said third constraint set has M−m+1 dimensions, where m=2;
    (B2) solving a second optimization problem for a second solution, said second optimization problem having a constraint set including said second constraint set, and having a second objective function incorporating each constraint in said third constraint set;
    (B3) solving a third optimization problem for a third solution, said third optimization problem having a constraint set including at least one constraint from said third constraint set, and having a third objective function having terms dependent on said second solution;
    (B4) recovering said first optimal or near-optimal assignment for said first optimization problem using said third solution.

24. A method as claimed in claim 23, further including a step of taking one or more of the following actions based on said first optimal or near-optimal assignment of said plurality of points to said plurality of tracks:
  sending a warning to aircraft or a ground or sea facility,
  controlling air traffic,
  controlling anti-aircraft or anti-missile equipment,
  taking evasive action,
  working on one of said at least one object,
  surveilling one of said at least one object.

25. A method as claimed in claim 23, wherein said first objective function receives input representing an assignment of said plurality of points to said plurality of tracks, said first objective function outputting a cost.

26. A method as claimed in claim 25, wherein said first optimal or near-optimal assignment satisfies said M-dimensional constraint set and the output cost of said first objective function is an extreme value when said first optimal or near-optimal assignment is input as said first input data.

27. A method as claimed in claim 23, wherein a solution to any one of said first, second and third optimization problems is an optimal or near-optimal solution.

28. A method as claimed in claim 23, wherein each dimension of said first optimization problem corresponds to a different subset of constraints of said M-dimensional constraint set, wherein each said different subset represents constraints for at least one of: a collection of said points from a different one of said images or data sets, and said plurality of tracks.

29. A method as claimed in claim 23, wherein said first objective function includes a summation of costs of said plurality of costs for combinations of assignments of points from said plurality of points.

30. A method as claimed in claim 23, wherein said scanning step is performed by at least one of radar, sonar, microwave, and infrared.

31. A method as claimed in claim 23, wherein said step of determining said plurality of costs includes:
extrapolating a first track of said plurality of tracks for said at least one object; and
determining at least some of said costs based on distances from each of said points to an extrapolation of said first track.

32. A method as claimed in claim 23, wherein said second objective function is

Maximize $\{\Phi_{2M}(u^3, \ldots, u^M) : u^k \in \mathbb{R}^{M_k+1}; k=3, \ldots, M\}$.

33. A method as claimed in claim 23, wherein said second optimization problem can be computed optimally using a two-dimensional optimization problem solving technique.

34. A method as claimed in claim 23, wherein said second objective function includes components of a multiplier or penalty vector in said terms incorporated into said second objective function, wherein said multiplier or penalty vector is used in compensating for said second optimization problem having fewer than M-dimensions.

35. A method as claimed in claim 33, wherein said second objective function is specified using a relaxed Lagrangian reduction technique on multiple dimensions simultaneously.

36. A method as claimed in claim 23, wherein said second objective function is

Maximize $\{\Phi_{mM}(u^{m+1}, \ldots, u^M) : u^k \in \mathbb{R}^{M_k+1}; k=m+1, \ldots, M\}$, $2 \leq m;\}$.

37. A method as claimed in claim 23, wherein said step of solving includes providing for each point in said plurality of points, a related constraint in said M-dimensional constraint set of constraints, wherein said related constraint determines a limit on a number of said tracks for assigning said point.

38. A method as claimed in claim 23, wherein no auxiliary function of a multiplier or penalty vector is used in determining a solution to said second optimization problem.

39. A method as claimed in claim 23, wherein said step (B2) of solving includes using all constraints in said second constraint set in determining a feasible solution for said second objective function.

40. A method as claimed in claim 23, wherein said step (B2) of solving said second optimization problem includes using a Lagrangian Relaxation technique for incorporating said terms related to said third constraint set into said second objective function.

41. A method as claimed in claim 23, wherein said step (B3) of solving includes formulating said third optimization problem as an assignment problem having M−m+1 dimensions.

42. A method as claimed in claim 23, wherein said step (B3) for solving said third optimization problem includes iteratively performing said steps of specifying said first optimization problem and solving said first optimization problem with progressively smaller dimensioned optimization problems for said first optimization problem.

43. A method as claimed in claim 23, further including a step of identifying a subset of said plurality of points which should be assigned to a subset of said tracks based on said plurality of costs.

44. A method as claimed in claim 43, further including separately assigning said subset of points to tracks of said subset of said plurality of tracks.

45. A method as claimed in claim 23, wherein said step (B2) of solving said second optimization problem includes reducing complexity from that of said first optimization problem by permitting at least a point of said plurality of points to be assigned to more than one track.

46. A method as claimed in claim 45, wherein said step (B2) of solving said second optimization problem includes reducing complexity from that of said first optimization problem by permitting points from M−m of the M sequential images or data sets to be assigned to more than one track.

47. A method as claimed in claim 23, wherein said constraint set for said third optimization problem includes every constraint of said third constraint set.

48. A method as claimed in claim 23, wherein said step (B3) of solving includes determining a plurality of factors for said terms of said third objective function wherein each factor includes a cost of said plurality of costs, said cost chosen using said second solution.

49. A method as claimed in claim 23, wherein said step of recovering includes determining $z^n$ as said optimal or near-optimal assignment, wherein:

$$z^n_{i_1 \ldots i_n} = \begin{cases} 1 & \text{if } (i_1, \ldots, i_m) = (i_1{}^j, \ldots, i_m{}^j) \text{ for some} \\ & j = 0, \ldots, N_0 \text{ and } Y_{ji_{m+1} \ldots i_n} = 1 \\ 0 & \text{otherwise} \end{cases}$$

where $$w^m_{i_1{}^j \ldots i_m{}^j} = 1$$

such that $w^m$ is said second solution and $(i_1{}^j, \ldots, i_m{}^j) \neq (0, \ldots, 0)$; and where y is said third solution.

50. A method for tracking objects, comprising:
repeatedly scanning a region containing a set consisting of one or more moving objects and generating M sequential images or data sets of said region, a plurality of points in said images or data sets providing positional information for objects in said set;
determining a plurality of tracks, at least one track for each object in said set;
determining a plurality of costs, wherein each cost is for assigning one of said points to one of said tracks;
solving a first optimization problem for determining a first optimal or near-optimal assignment of said plurality of points to said tracks, said first optimization problem having an M-dimensional first plurality of constraints, wherein constraints of said first plurality of constraints determine a limit on a number of said tracks for assigning said points;
wherein said step of solving includes the steps (B1) and (B2):

(B1) determining a maximum value for $\{\Phi_{mM}(u^{m+1}, \ldots, u^M) : u^k \in \mathbb{R}^{M_k+1}; k=m+1, \ldots, M\}$, $2 \leq m;$ (B2) recovering said first optimal or near-optimal assignment for said first optimization problem using said maximum value.

51. A method as claimed in claim 50, further including a step of taking one or more of the following actions based on said first optimal or near-optimal assignment of said plurality of points to said plurality of tracks:

sending a warning to aircraft or a ground or sea facility, controlling air traffic, controlling anti-aircraft or anti-missile equipment, taking evasive action, working on at least one object of said set, surveilling at least one object of said set.

52. A method as claimed in claim 50, wherein said step (B1) has a computationally tractable optimal solution when m=2.

53. A method as claimed in claim 50, wherein said step of solving further includes formulating an (M−1)-dimensional optimization problem having an objective function with cost factors determined using an optimal solution to a two dimensional optimization problem obtained directly from said first optimization problem wherein an objective function for said two dimensional optimization problem is provided in (B1).

54. A method as claimed in claim 50, wherein said step of solving includes using a relaxed Lagrangian reduction technique on multiple dimensions simultaneously.

55. A method for tracking objects, comprising:

repeatedly scanning a region containing a set consisting of one or more moving objects and generating M sequential images or data sets of said region, a plurality of points in said images or data sets providing positional information for objects in said set;

determining a plurality of tracks, at least one track for each object in said set;

determining a plurality of costs, wherein each cost is for assigning one of said points to one of said tracks;

solving a first optimization problem for determining a first optimal or near-optimal assignment of said plurality of points to said tracks, said first optimization problem having:

(C1) a first objective function created using said plurality of costs, said first objective function receiving first input data indicating an assignment of said plurality of points to said plurality of tracks, said first objective function outputting a cost;

(C2) an M-dimensional first plurality of constraints, wherein constraints of said first plurality of constraints determine a limit on a number of said tracks for assigning said points;

wherein said step of solving includes specifying a second objective function, said second objective function derived from said first objective function by incorporating a set of constraints from said first plurality of constraints into said first objective function, said set of constraints including constraints on the assignments of points in at least two of said images or data sets; and solving a second optimization problem having said second objective function and having all constraints of said first optimization problem except the constraints in said set of constraints;

recovering said first optimal or near-optimal assignment for said first optimization problem using a solution to said second optimization problem.

56. A method for tracking at least one object, comprising:

repeatedly scanning a region containing a set consisting of one or more moving objects and generating M sequential images or data sets of said region, a plurality of points in said images or data sets providing positional information for objects in said set;

providing at least one track in a collection of tracks for each object in said set, said at least one track related to said positional information for the object;

specifying an initial optimization problem for determining a track extension for each track of said collection of tracks, each said track extension determined using points from a plurality of points representing positional information for each object being tracked, wherein said initial optimization problem has M constraint dimensions, each constraint dimension constraining a different set of points in said plurality of points;

solving said initial optimization problem by:

(A1) solving at least one optimization problem derived from said initial optimization problem by simultaneously relaxing at least two constraint dimensions; and (A2) using a solution to each optimization problem solved in (A1) to obtain an optimal or near-optimal solution to sad initial optimization problem.

57. A method for tracking at least one object, comprising:

providing at least one track in a collection of tracks, wherein, for each object being tracked said collection of tracks includes a track related to the object;

specifying an initial optimization problem for determining a track extension for each track of said collection of tracks, each said track extension determined using points from one of M−1 and M sequential images or data-sets of a region, said points representing positional information for each object being tracked, wherein said initial optimization problem has one of M and M+1 constraint dimensions, respectively, each of at least some of said constraint dimensions constraining points from different said images or data-sets;

solving said initial optimization problem by:

(A1) solving at least one optimization problem derived from said initial optimization problem by simultaneously relaxing at least two constraint dimensions; and (A2) using a solution to each optimization problem solved in (A1) to obtain an optimal or near-optimal solution to said initial optimization problem.

58. A method as claimed in claim 33, wherein said two-dimensional assignment solving technique uses a bundle trust method.

* * * * *